(12) United States Patent
Nakamichi et al.

(10) Patent No.: US 6,781,341 B2
(45) Date of Patent: Aug. 24, 2004

(54) ABNORMALITY DETECTOR FOR A MOTOR DRIVE SYSTEM

(75) Inventors: Masaki Nakamichi, Tokyo (JP); Kohji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/288,283

(22) Filed: Nov. 6, 2002

(65) Prior Publication Data

US 2003/0218443 A1 Nov. 27, 2003

(30) Foreign Application Priority Data

May 21, 2002 (JP) .................................... P2002-146325

(51) Int. Cl.[7] .............................................. G05B 19/40
(52) U.S. Cl. ....................... 318/685; 318/696; 318/280; 318/283; 318/445; 318/446; 318/430; 318/432; 318/434
(58) Field of Search .............................. 318/445, 446, 318/685, 696, 430, 432, 434, 254, 599, 700, 280, 283; 310/49

(56) References Cited

U.S. PATENT DOCUMENTS

| | | | | |
|---|---|---|---|---|
| 5,264,769 A | * | 11/1993 | Itoh | 318/685 |
| 5,625,269 A | * | 4/1997 | Ikeda | 318/696 |
| 5,861,726 A | * | 1/1999 | Uchikata et al. | 318/685 |
| 5,889,734 A | * | 3/1999 | Sato | 368/64 |
| 5,929,589 A | * | 7/1999 | Suzuki et al. | 318/685 |
| 6,140,792 A | * | 10/2000 | Kameyama et al. | 318/685 |
| 6,407,527 B1 | * | 6/2002 | Misumi | 318/685 |
| 6,515,446 B1 | * | 2/2003 | Koide et al. | 318/700 |

FOREIGN PATENT DOCUMENTS

| | | | | |
|---|---|---|---|---|
| JP | 402294299 A | * | 5/1989 | H02P/8/00 |
| JP | 404364399 A | * | 6/1991 | H02P/8/00 |
| JP | 3-203599 A | | 9/1991 | |
| JP | 5-18315 A | | 1/1993 | |
| JP | 405184199 A | * | 7/1993 | H02P/8/00 |
| JP | 7-99796 A | | 4/1995 | |
| JP | 7-92016 B2 | | 10/1995 | |
| JP | 10-257799 A | | 9/1998 | |

* cited by examiner

Primary Examiner—David Martin
Assistant Examiner—Tyrone Smith
(74) Attorney, Agent, or Firm—Sughrue Mion, PLLC

(57) ABSTRACT

An abnormality detector for motor drive system easily detects, using a CPU, abnormality such as short circuit or disconnection in magnetic field coils of a motor, wiring, an open/close element, etc., which are controlled by a microprocessor (CPU). The open/close elements conducting an open/close operation sequentially in response to pulse outputs P1, P2 generated by the CPU, drive the magnetic field coils. Surge voltages generated upon interrupting the mentioned open/close elements are OR connected through a diode, and input to a temporary storage circuit. Then the CPU reads out, stores and resets the surge voltages using pulse edges of the pulse output P1 or P2. When any generation of the surge voltage is not stored in the temporary storage circuit, the CPU operates an abnormality alarm display.

14 Claims, 12 Drawing Sheets

ABNORMALITY DETECTOR FOR A MOTOR DRIVE SYSTEM

BACKGROUND OF THE INVENTION

1. Field of the Invention

The present invention relates to an abnormality detector for detecting an abnormality of a motor drive system for use in a drive control, e.g., of a regulating valve of a circulation gas amount or an idle engine speed controlling intake valve, which are mounted in an exhaust gas circulation path of an automobile engine. More particularly, the invention relates to an improved abnormality detector for detecting an abnormality of a motor drive system by which it is easy to detect an abnormality such as disconnection, short circuit or the like in multiphase magnetic field coils themselves, driving open/close elements of the magnetic field coils, wiring between the magnetic field coils and the open/close elements or the like used in the motor drive system.

2. Description of the Related Art

As means for detecting an abnormality such as disconnection, short circuit or the like at a load itself, a driving open/close element, wiring between the load and the open/close elements or the like with magnetic field coils for a stepping motor being the load, a variety of attempts have been disclosed. A typical method thereof is as follows:

A. Load Current Detection Method

This is a method for monitoring a voltage drop generated at current detecting series resistors at the time of power-conducting magnetic field coils acting as a load, and determining whether or not an appropriate current flows. This method is for detecting an abnormality at each part from an overall standpoint by utilizing a fact that a load short circuit, a wiring short circuit or the like causes an excessive current flow, while a load disconnection, a wiring disconnection, a closed circuit abnormality or the like allows only a current of less than a predetermined value to flow.

This load current detection method is effective also in order to prevent the open/close elements from being damaged as a result of automatically interrupting the open/close elements when a short circuit abnormality occurs at the load or wiring. In the case, however, where an electrical load is an inductive load, a delay in current elevation usually takes place just after power-conducting the open/close elements and, therefore a delay detection processing is required so as not to determine impatiently such a state of current elevation as a disconnection abnormality.

B. Leakage Current Detection Method

This is a method for connecting resistors of a high resistance through which a leakage current flows, in parallel to load driving open/close elements, and monitoring a dividing voltage at the resistors of high resistance. Supposing that there is no leakage current flowing to the load when interrupting the open/close elements, an abnormality at each part is detected in an overall manner as a disconnection in load or wiring, or a short circuit abnormality in the open/close elements.

C. Surge Voltage Detection Method

This is a method for detecting a surge voltage generated by an inductive load, at the time of interrupting the load driving open/close elements. Supposing that there is no surge voltage, an abnormality at each part is detected in an overall manner as a disconnection in load or wiring, an interruption abnormality at the open/close elements and an interruption abnormality due to the short circuit in load or wiring. Also in this surge voltage detection method, a delay in generation of surge voltage takes place just after interrupting the open/close elements, and therefore a delay detection processing is required so as not to determine impatiently such a state as a abnormality.

The Japanese Patent Publication (unexamined) No. 203599/1991 (JP No. 2639144) titled "Exhaust Gas Circulation Valve Controller" (literature) discloses an example of a drive control for a stepping motor based on the the mentioned load current detection method. The Japanese Patent Publication (unexamined) No. 257799/1998 titled "Output Open Detector for Multi-Channel Output Device" (literature B) discloses an example of a drive control for a stepping motor based on the mentioned leakage current detection method. The Japanese Patent Publication (unexamined) No. 99796/1995 titled "Drive for Stepping Motor" (literature AB) discloses an example of a drive control for a stepping motor employing both of the mentioned load current detection method and leakage current detection method.

On the other hand, publicly known abnormality detection means for a plurality of electrical loads are broadly classified into: an external hardware method, in which a result obtained by carrying out determination and synthesis with the use of a hardware (H/W) is fetched in a microprocessor; and an internal software (S/W) method in which a synthesized state signal is inputted to the microprocessor, and a determination processing is carried out inside of the microprocessor.

In the mentioned literature A, an external H/W method is disclosed, in which an abnormality as to four magnetic field coils of a stepping motor is delay-latched, and after AND-connection thereof, a result of synthesis abnormality determination is fetched in the microprocessor. In the mentioned literature B, an external H/W method is disclosed, in which a normal state signal as to four magnetic field coils in a stepping motor are OR-connected by means of a diode, an integral circuit is reset using an output signal from the diode, and an output from the integral circuit can be fetched in the microprocessor as a result of synthesis abnormality determination when required. In the mentioned literatures AB, an internal S/W method is disclosed, in which various state signals are logically connected and inputted to a microprocessor, and a period and a duty ratio of the inputted pulse train are monitored in the microprocessor, whereby detection of disconnection and short circuit is carried out.

As a further known art relating to this invention, the Japanese Patent Publication (examined) No. 92016/1995 titled "Failure Detection Circuit of Fuel Injection Valve Drive Circuit for Internal Combustion Engine" (literature C) discloses an example of a drive control of an electromagnetic coil for fuel injection valve drive based on the mentioned surge voltage detection method.

Furthermore, in the Japanese Patent Publication (unexamined) No. 18315/1993 titled "Automobile Engine Control Apparatus" (literature D), it is described that, in order to carry out initialization of an actuator which is drive-controlled by a microprocessor incorporated in an engine control apparatus, a power is fed to the engine control apparatus via a power supply relay driven by a power supply switch, operation of the mentioned power supply relay continues even after turning OFF the power supply switch, and the power supply relay is interrupted by ending the initialization.

Among the various conventional arts as described above, the external H/W method shown in the literature A or B has a disadvantage from the view points of dimensions and cost, whereas the internal S/W method as shown in the literature AB may be desired in such viewpoints. However, in the art disclosed by the literature AB, there is no concept of specifying which load system falls within an abnormality among a large number of electrical loads, eventually resulting in a disadvantage of making it difficult to carry out a maintenance work.

Moreover, it is certain that any abnormality in the magnetic field coils, the open/close elements, the wiring or the like can be detected in an overall manner when applying the surge voltage detection method disclosed in the literature C to multiphase magnetic field coils. A problem, however, exists in that when synthesizing surge voltages in multiphase magnetic field coils in parallel, it becomes difficult to extract and detect an abnormal phase as long as the stepping motor is driven at a high speed.

SUMMARY OF THE INVENTION

A first object of the present invention is to provide an abnormality detector for motor drive system capable of making a maintenance work easy by using an individual state detection signal provided by an external H/W simply at a reasonable cost through a detection of a surge voltage, and in which the individual state detection signals are logically combined to constitute a single synthetic state detection signal and inputted to a microprocessor, an appropriate abnormality detection is carried out by a S/W processing in the microprocessor while avoiding abnormality detection during operation at a high speed, and an abnormal load system can be specified.

To accomplish the foregoing first object, an abnormality detector according to the invention includes: a plurality of open/close elements that, in response to an interrupt signal generated by a microprocessor, energizes multiphase magnetic field coils in a predetermined order and drives a stepping motor in forward/reverse rotation; individual state detection means for each phase; synthetic state detection means for all phases; temporary storage means; individual determination storage means; reset means; and abnormality alarm display means. The mentioned individual state detection means detects individually a surge voltage for each phase, the surge voltage being generated at the time of interrupting the power conduction through the mentioned magnetic field coils by the mentioned open/close elements, and confirms power conduction through the mentioned magnetic field coils or interruption thereof. The mentioned synthetic state detection means logically adds signals detected by the mentioned individual state detection means, and generates a synthesized signal in order to confirm power conduction through the mentioned magnetic field coils or interruption thereof for all phases. The mentioned temporary storage means stores generation of a synthesized signal detected by the mentioned synthetic state detection means. The mentioned individual determination storage means reads out a content of the mentioned temporary storage stored with an interval of a fluctuation delay time immediately after an initial rise or fall of the mentioned interrupt signal following a pause for not less than a predetermined time of the mentioned interrupt signal at the moment of a next rise or fall of the mentioned interrupt signal, and stores presence or absence of an abnormality (whether or not there is any abnormality) for each phase. The mentioned reset means deletes the content in the mentioned temporary storage means after the mentioned individual determination storage means stores presence or absence of an abnormality for each phase at this time, and enables a synthesized signal generated at the next time to be stored. The mentioned abnormality alarm display means operates an abnormality alarm display in response to a fact that at least one of the mentioned individual determination storage means stores any abnormality. Further, the mentioned individual determination storage means stores, for each phase of which power-conduction has been interrupted, a fact that any synthesized detection signal of the mentioned surge voltage is not generated upon initially interrupting the power conduction after the mentioned stepping motor pauses for not less than a predetermined time, and carries out an abnormality determination at the time of starting a forward/reverse drive of the mentioned stepping motor.

As a result, number of signals to be processed is reduced thereby making a hardware constitution inexpensive and simple. Furthermore, even if the detected surge voltage comes to form a seamless and continuous waveform at a high-speed operation of the stepping motor, abnormality for each phase can be detected without fail.

A second object of the invention is to provide an abnormality detector for motor drive system capable of making a maintenance work easier, and in which using an individual state detection signal provided by an inexpensive and simple external H/W for detecting a surge voltage, a plurality of synthetic state detection signals obtained by connecting logically the individual state detection signals are inputted to a microprocessor, thereby enabling an abnormality determination during a high-speed operation, and exact abnormality detection is carried out by a S/W processing in the microprocessor, and an abnormal load system can be specified.

To accomplish the foregoing object, an abnormality detector for motor drive system includes: a plurality of open/close elements that, in response to an interrupt signal generated by a microprocessor, energizes multiphase magnetic field coils in a predetermined order and drives a stepping motor in forward/reverse rotation; individual state detection means for each phase; first and second synthetic state detection means for detecting first and second synthetic states; temporary storage means; individual determination storage means; reset means; and abnormality alarm display means. The mentioned individual state detection means detects individually a surge voltage for each phase, the surge voltage being generated when interrupting the power conduction through the mentioned magnetic field coils by the mentioned open/close elements, and generates a detection signal in order to confirm power conduction through the mentioned magnetic field coils or interruption thereof. The mentioned first and second synthetic state detection means logically adds signals in a group, which does not operate adjacently, among the signals detected by the mentioned individual state detection means, and generates a synthesized signal in order to confirm power conduction through magnetic field coils or interruption thereof for each group. The mentioned temporary storage means separates the synthesized signals, which have been detected by the mentioned first and second synthetic state detection means, at least for each group, via a first and second interrupt input terminals, and stores the separated signal in the RAM memory in the mentioned microprocessor. The mentioned individual determination storage means reads out a content of the mentioned temporary storage stored for each group with an interval of a fluctuation delay time immediately after a previous rise or fall of the mentioned interrupt signal output for each group at the moment of a rise or fall of the mentioned interrupt signal this time, and stores presence or absence of an abnormality (whether or not there is any abnormality) for each phase. The mentioned reset means deletes the content in the mentioned temporary storage means after the mentioned individual determination storage means stores presence or absence of an abnormality for each phase at this time, and enables a synthesized signal generated at the next time to be stored. The mentioned abnormality alarm display means operates an abnormality alarm display in response to a fact that at least one of the mentioned individual determination storage means stores any abnormality, and enables the abnormality determination in a state of the mentioned stepping motor being continuously driven at a high speed.

As a result, a surge voltage acting as a detecting signal for each group shows an intermittent waveform even when the stepping motor operates at a high speed, thereby enabling the abnormality detection for each phase. Furthermore, number of signals to be processed is reduced thereby enabling simple and inexpensive abnormality detection.

The other objects and features of this invention will become understood from the following description with reference to the accompanying drawings.

DETAILED DESCRIPTION OF THE PREFERRED EMBODIMENTS

Embodiment 1

1. Detailed Description of Constitution of Embodiment 1

Figure 1:
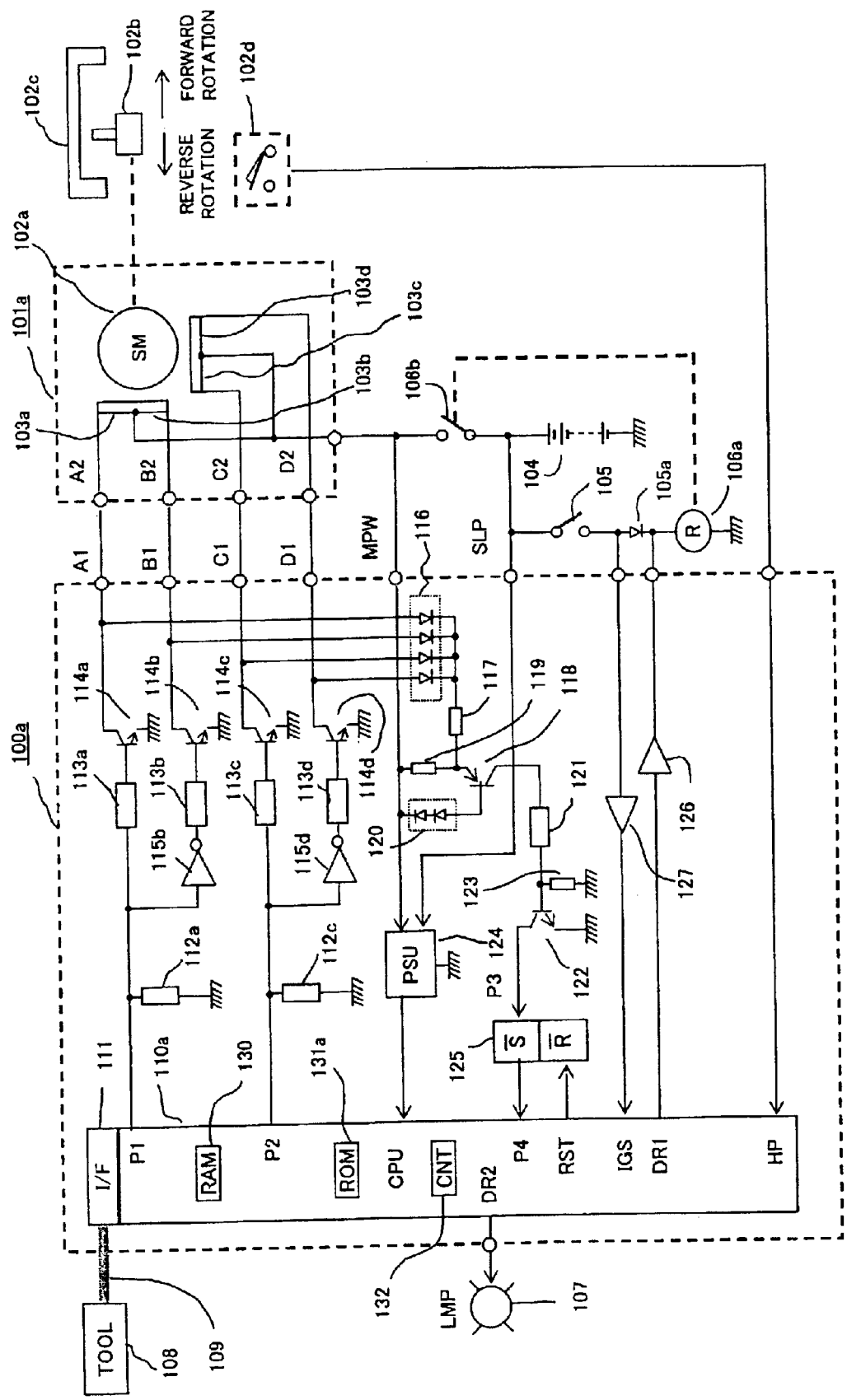
FIG. 1 is a block diagram showing an abnormality detector for motor drive system according to a first preferred embodiment of the present invention.

FIG. 1 is a block diagram showing a constitution of detector according to a first preferred embodiment of the present invention. With reference to FIG. 1, reference numeral 100a designates an abnormality detector that contains a microprocessor 110a, and controls driving a stepping motor 101a, which is connected to the abnormality detector 100a from outside. Numeral 102a designates a rotor in the mentioned stepping motor 101a. Numeral 102b designates a moving body conducting a forward and reverse rotational operation in directions indicated by arrows by means of the mentioned rotor. Numeral 102c designates a stopper located at a forward/reverse rotation limit position of the mentioned moving body 102b. Numeral 102d designates a return-detecting switch that closes a circuit when the mentioned moving body 102b reaches a reverse rotation limit position, that is, when the mentioned stepping motor 101a returns to its origin position. Numerals 103a, 103b, 103c, 103d are multiphase magnetic field coils, and one end of each magnetic field coil is connected to connector terminals A1, B1, C1, D1 of the mentioned abnormality detector 100a via connector terminals A2, B2, C2, D2.

Numeral 104 designates an on-vehicle battery acting as a power supply of the stepping motor 101a. Numeral 105 designates a power supply switch. Numeral 106a designates a power supply relay energized via the power supply switch 105 and a diode 105a from the on-vehicle battery 104. Numeral 106b designates an output contact of this relay. The other ends of the mentioned magnetic field coils 103a, 103b, 103c, 103d are connected to the on-vehicle battery 104 via the output contact 106b.

SLP designates a terminal of the mentioned abnormality detector 100a, and which is connected to the on-vehicle battery 104. MPW designates a terminal of the abnormality detector 100a, and which is connected to the on-vehicle battery 104 via the output contact 106b. Numeral 107 designates an abnormal alarm display (LMP) driven from DR2 of the abnormality detector 100a. Numeral 108 designates an external tool connected to a communicating interface (I/F) 111 of the abnormality detector 100a via a cable 109.

As for an internal constitution of the abnormality detector 100a, numerals 114a, 114b, 114c, 114d designate open/close elements composed of transistors. Numerals 113a, 113b, 113c, 113d designate base resistors that drive the mentioned open/close elements. Numeral 115b, 115d designate logic inversion elements connected to the base resistors 113b, 113d respectively. Numerals 112a, 112c designate pull-down resistors connected to interrupt signal outputs P1, P2 from the microprocessor 100a.

Among the open/close elements 114a, 114b, 114c, 114d, the open/close elements 114a and 114c are fed with the interrupt signal outputs P1, P2 via the base resistors 113a and 113c, respectively. Further, the open/close element 114b and the open/close element 114d are electrically fed via the logic inversion element 115b and the base resistor 113b as well as via the logic inversion element 115d and the base resistor 113d. Collect or terminals of the open/close elements 114a, 114b, 114c, 114d are connected to the connector terminals A1, B1, C1, D1 to drive the mentioned magnetic field coils 103a, 103b, 103c, 103d, and further connected to a resistor 117 via an OR connecting diode 116.

Numeral 118 designates a transistor, an emitter terminal of which is connected to the power supply terminal MPW via an emitter resistor 119 and further connected to a cathode side of the OR connecting diode 116 via a resistor 117. Numeral 120 designates a dropper diode connected between the base terminal of the foregoing transistor 118 and the power supply terminal MPW. Numeral 121 designates a base resistor that is connected to the collector terminal of the transistor 118 and drives a transistor 122. Numeral 123 designates ballast resistor connected between the base/emitter terminals of the transistor 122.

Numeral 124 designates a power supply unit, which is fed from the mentioned power supply terminal MPW and a SLP terminal, and generates a controlling constant voltage output to feed power to the microprocessor 110a. Further the power supply from the mentioned power supply terminal SLP is used as a sleep power supply when the output contact 106b is open. Numeral 125 designates a flip-flop circuit acting as temporary storage means, and which is driven from the collector terminal of the mentioned transistor 122.

Numeral P4 designates an input signal for reading a set output from the flip-flop circuit 125 into the microprocessor 110a. RST designates a reset input signal to the flip-flop circuit 125 generated by the microprocessor 110a in order to reset the mentioned flip-flop circuit 125. Numeral P3 designates a synthetic state detection signal acting as a set input signal to the mentioned flip-flop circuit 125.

Numeral DR1 designates a drive output from the microprocessor 110a. Numeral 126 designates a drive element for continuously holding operation of the power supply relay 106a bathe mentioned drive output DR1. Numeral DR2 designates a drive output from the microprocessor 110a for driving the abnormality alarm display 107. Once energized by means of the power supply switch 105, the power supply relay 106a is held in the state of operation by the drive output DR1 even when the power supply switch 105 is open. The power supply relay 106a is de-energized after the microprocessor 110a carries out an initializing operation and stops the drive output DR1. Furthermore, the microprocessor 110a carries out a control operation or communication with the external tool 108 in accordance with a program stored in a ROM memory 131a.

Numeral 132 designates a current value counter (CNT) of the microprocessor 110a, and which conducts an interrupt count of a rising edge and a falling edge of the interrupt signal output P1. The current value counter 132 conducts a reversible counting in accordance with a logic level of the interrupt signal output P2 at the time of counting, and indicates a current position of the stepping motor 101a. HP designates an input to the microprocessor 110a, and to which the return-detecting switch 102d is connected.

The return-detecting switch 102d is used to confirm an origin position of the actuator such as an open/close valve, which is driven by the stepping motor 101a, and output a completion signal of the returning operation. In the case, however, that return-to-origin is achieved by a contact stopper method, the return-detecting switch 102d is unnecessary. It is possible to carry out a control for regarding as completion of the return-to-origin just by driving the stepping motor 101a sufficiently in a returning direction. IGS designates a power supply detecting input signal connected to the power supply switch 105 via the interface circuit 127.

2. Detailed Description of Operation in Embodiment 1

Figure 2:
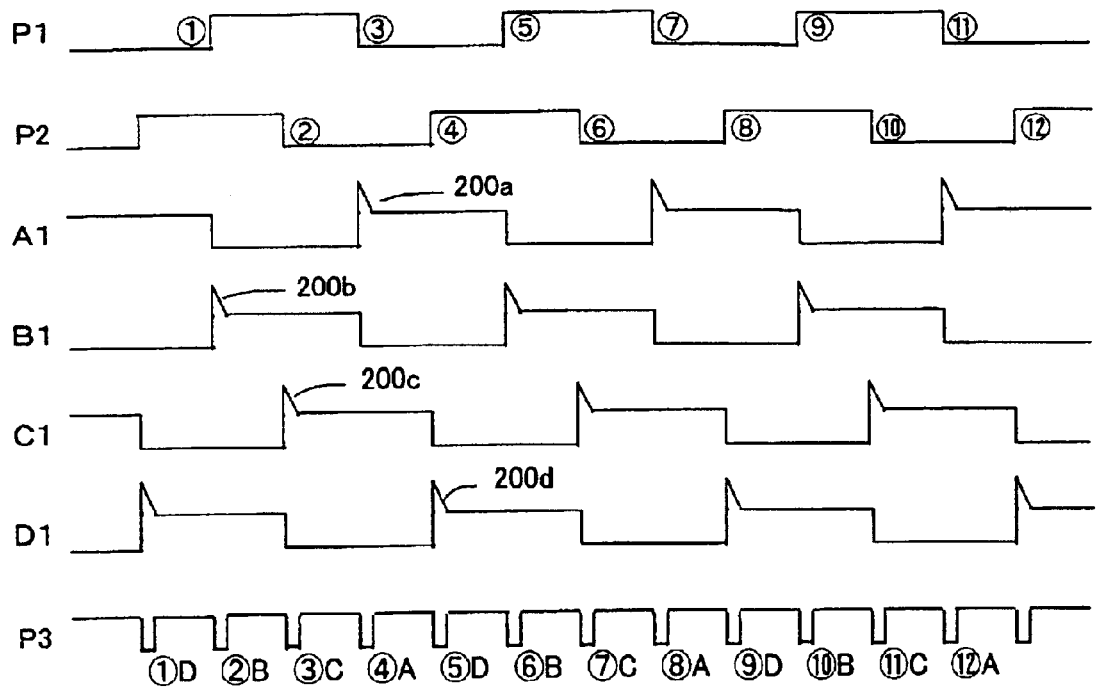
FIG. 2 is a time chart for explaining a forward rotational operation of a stepping motor of FIG. 1.

In the first embodiment according to the invention arranged as shown in FIG. 1, operation thereof is described first with reference to a time chart of the forward rotational operation of the stepping motor 101a shown in FIG. 2. Referring to FIG. 2, a rising edge of the interrupt signal output P1 from the microprocessor 110a is indicated by numerals ①⑤⑨, and a falling edge thereof is indicated by numerals ③⑦⑪. Further, a rising edge of the interrupt signal output P2 from the microprocessor 101a is indicated by numerals ④⑧⑫, and a falling edge thereof is indicated by numerals ②⑥⑩. At a point of the rising edge ①⑤⑨ of the interrupt signal output P1, the interrupt signal output P2 is kept at a level of "H": while at a point of the falling edge ③⑦⑪ of the interrupt signal output P1, the interrupt signal output P2 is kept at a level of "L". This state of outputs shows a forward rotation state.

Numerals A1, B1, C1, D1 in FIG. 2 indicate voltage wave forms of the collector terminals of the open/close elements 114a, 114b, 114c, 114d, that is, voltage waveforms of the connector terminals A1, B1, C1, D1 of the abnormality detector 100a. When power conduction is going on through the magnetic field coils 103a, 103b, 103c, 103d, the waveforms A1, B1, C1, D1 are at "L" level: while when power conduction through the magnetic field coils is interrupted, the waveforms are at "H" level.

Numeral 200a to 200d designate surge voltages each acting as an individual state detection signal. Among these surge voltages, numeral 200a is a surge voltage waveform when power conduction through the magnetic field coil 103a is interrupted at the falling edge ③ of the interrupt signal output P1. Numeral 200b is a surge voltage waveform when power conduction through the magnetic field coil 103b is interrupted at the rising edge ① of the interrupt signal output P1. Numeral 200c is a surge voltage waveform when power conduction through the magnetic field coil 103c is interrupted at the falling edge ② of the interrupt signal output P2. Numeral 200d is a surge voltage waveform when power conduction through the magnetic field coil 103d is interrupted at the rising edge ④ of the interrupt signal output P2.

Current produced by each surge voltage 200a to 200d is absorbed in the on-vehicle battery 104 via the OR connecting diode 116 through the resistor 117, the emitter resistor 119 and the output contact 106b. A part of the current, however, flows in the dropper diode 120 and drives the transistor 118, and therefore the transistor 122 is driven via the transistor 118 and the base resistor 121. As a result, when the surge voltages 200a to 200d are generated, the collector terminal of the transistor 122 is kept at "L" level, which represents a normal signal. This signal is fetched as a synthetic state detection signal P3 in the flip-flop circuit 125 acting as temporary storage means.

However, when the surge voltages 200a to 200d are not generated, the collector output from the transistor 122 remains at a level of logic "H", and the flip-flop circuit 125 is not set. A content of the flip-flop circuit 125 is read out and determined at the next timing (i.e., at the rising edge or the falling edge of the signal outputs P1, P2), and there after reset. Then a new input signal P3 is stored therein.

Figure 3:
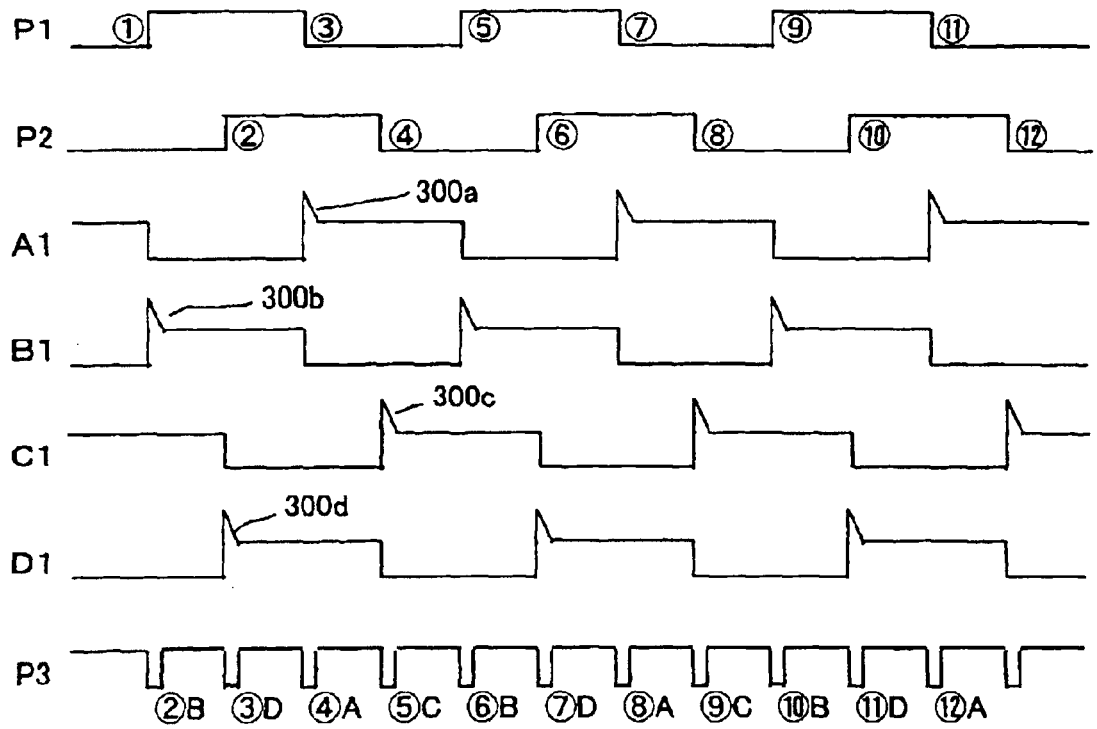
FIG. 3 is a time chart for explaining a reverse rotational operation of the stepping motor of FIG. 1.

In the first embodiment according to this invention arranged as shown in FIG. 1, the action and operation thereof is described with reference to a chart of a reverse rotational operation of the stepping motor 101a shown in FIG. 3. Referring to FIG. 3, the rising edge of the interrupt signal output P1 from the microprocessor 110a is indicated by numerals ①⑤⑨, and the falling edge thereof is indicated by numerals ③⑦⑪. Furthermore, the falling edge of the interrupt signal output P2 from the microprocessor 110a is indicated by numerals ④⑧⑫, and the rising edge thereof is indicated by numerals ②⑥⑩. At a point of the rising edge ①⑤⑨ of the interrupt signal output P1, the interrupt signal output P2 is kept at a level of "L": while at a point of the falling edge ③⑦⑪ of the interrupt signal output P1, the interrupt signal output P2 is kept at a level of "H".

Numerals A1, B1, C1, D1 in FIG. 3 show voltage waveform of the collector terminal of the open/close elements 114a, 114b, 114c, 114d, that is, voltage waveform of the connector terminals A1, B1, C1, D1 of the abnormality detector 100a. The voltage waveforms are at "L" level when power conduction is going on through the magnetic field coils 103a, 103b, 103c, 103d: while they are at "H" level when power conduction through the magnetic field coils are interrupted.

Numerals 300a to 300d show surge voltages each acting as an individual state detection signal. Among the surge voltages, numeral 300a shows a surge voltage waveform when power conduction through the magnetic field coil 103a is interrupted at the falling edge ③ of the interrupt signal output P1. Numeral 300b shows a surge voltage waveform when power conduction through the magnetic field coil 103b is interrupted at the rising edge ① of the interrupt signal output P1. Numeral 300c shows a surge voltage waveform when power conduction through the magnetic field coil 103c is interrupted at the falling edge of the interrupt signal output P2. Numeral 300d shows a surge voltage waveform when power conduction through the magnetic field coil 103d is interrupted at the rising edge ② of the interrupt signal output P2.

Current produced by each surge voltage 300a to 300d is absorbed in the on-vehicle battery 104 via the OR connecting diode 116 through the resistor 117, the emitter resistor 119 and the output contact 106b, shown in FIG. 1. A part of the current, however, flows in the dropper diode 120 and drives the transistor 118, and therefore the transistor 122 is driven via the transistor 118 and the base resistor 121.

As a result, in the same manner as in the case of FIG. 2, the input signal P3 to the flip-flop circuit 125 is kept at "L" level as long as the surge voltage is generated. Additionally, in a pulse train P3 in FIG. 2 or 3, numeral ② B means reading and determining a state signal of the magnetic field coil 103b generated by the surge voltage 300b at the timing ②.

Figure 4:
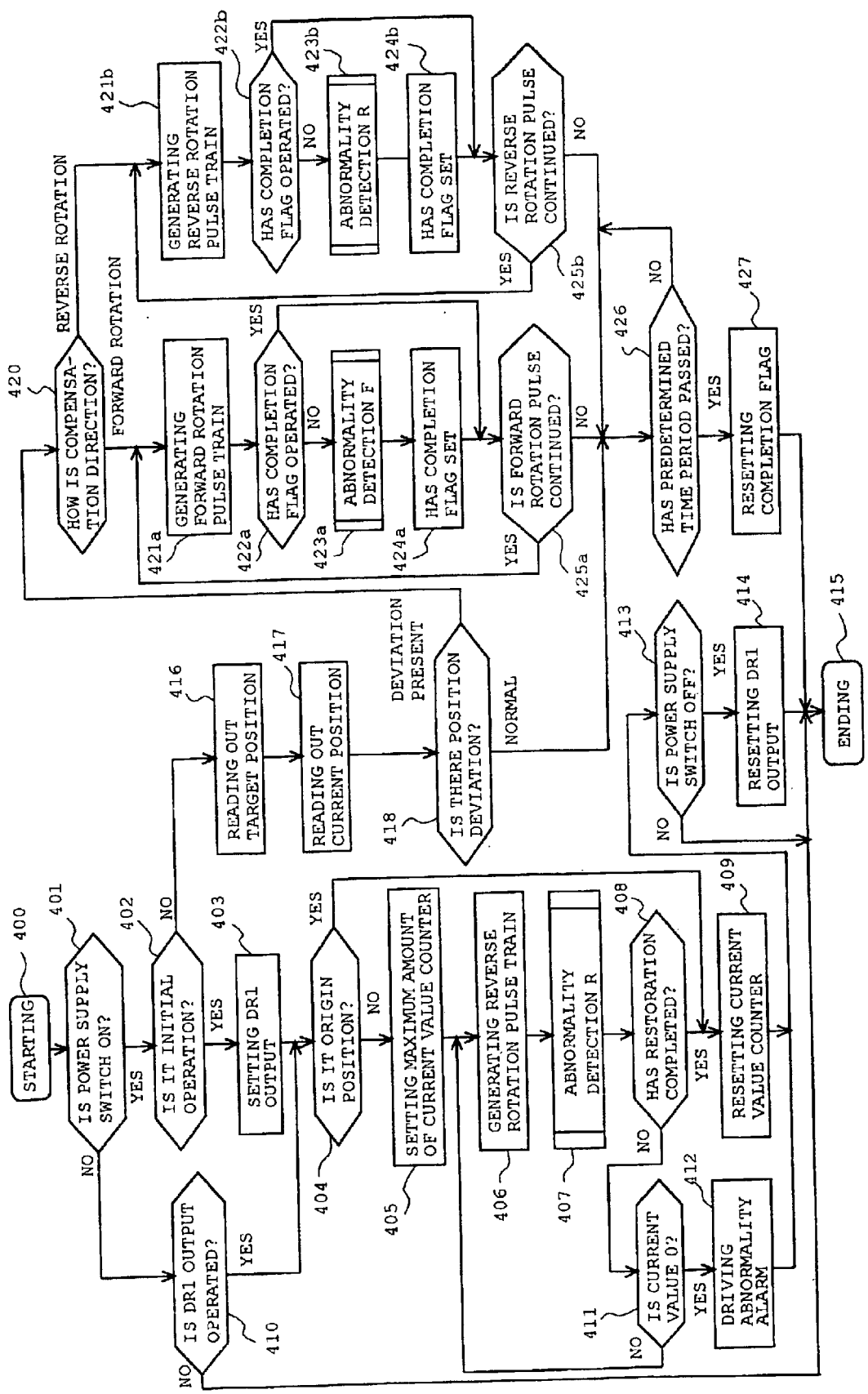
FIG. 4 is a flowchart for explaining the entire operation.

With reference to FIG. 4 showing a flowchart for explaining the entire operation of the detector shown in FIG. 1, numeral 400 is an operation start step of the microprocessor 101a. Numeral 401 is a step that operates following the step 400, and determines whether or not the IGS input (power supply input) operates. Numeral 402 is a step that operates when step 401 determines YES, and determines whether or not it is an initial operation immediately after turning on the power supply depending on whether or not a DR1 output, described hereinafter, (power supply hold drive output) is set. Numeral 403 is a step that operates when step 402 is the initial operation, and sets the drive output DR1. Numeral 404 is a step that operates following the step 403, and determines whether or not the return-to-origin-detecting switch 102d operates. Numeral 405 is a step (maximum amount setting means) that operates when step 404 determines not any return-to-origin position, and sets the current value counter 132 to a maximum amount. The maximum amount, described herein, is a pulse amount necessary for the moving body 102b, shown in FIG. 1, to move from a forward rotation limit position to a reverse rotation limit position, the positions being defined by the stopper 102c.

Numeral 406 is a step (return-to-origin operation control means) that operates following the step 405, and generates interrupt signal outputs P1, P2 acting as a reverse rotation pulse train for returning to the origin. Numeral 407 is a subroutine program, described later referring to FIG. 6, which operates following the foregoing step 406. Numeral 408 is a step that operates following the subroutine program 407, and determines whether or not the return-to-origin-detecting switch 102d has operated. Numeral 409 is a step that operates when step 408 determines a completion of returning, and resets the current value counter 132 to 0.

Numeral 410 is a step that operates when step 401 determines NO, i.e., the power supply switch 105 is determined OFF, and determines whether or not the DR1 output is set. When step 410 determines YES, as well as the DR1 output has already been set, the operation proceeds to step 404. Numeral 411 is a step (return abnormality determination means) that operates when step 408 determines not the return-to-origin position, and determines whether or not a current value of the current value counter 132 is 0. When step 411 determines NO, the operation proceeds to step 406, where producing a reverse rotation pulse decreases a current value.

Numeral 412 is a step (abnormality alarm display means) that operates when step 411 determines YES, and drives the abnormality alarm display 107. In step 412, it is determined that the stepping motor 101a does not rotate normally based on a fact that the return-detecting switch 102d does not act in step 408, despite that a reverse rotation pulse corresponding to a sufficient setting value set in the mentioned step 405 was given and step 411 determines a current value 0.

Numeral 413 is step that operates following the step 409 or step 412, and determines whether or not the power supply switch input IGS is OFF. Numeral 414 is a step that operates when the foregoing step 413 determines YES, i.e., the power supply switch 105 is OFF, and resets the drive output DR1, which has been set in step 403. Numeral 415 is an operation end step that operates when step 410 or step 413 determines NO, or following the step 414. Thus, the foregoing control operation is to be carried out repeatedly on the basis that the operation start step 400 is activated again in the operation end step 415.

Numeral 416 is a step that operates when step 420 determines NO and the returning operation has completed, and reads out a target rotational position of the stepping motor 101a from the drive control means, not shown. Numeral 417 is a step that operates following the step 416, and reads out a current value of the current value counter 132. Numeral 418 is a step that operates following the step 417, and compares the target position read out in step 416 with the current value read out in step 417.

Numeral 420 is a step that operates when step 418 determines a positional deviation excessively large, and determines a compensating rotational direction depending on plus or minus of the positional deviation. Numeral 421a is a step that operates when determines a forward rotation, and generates a forward rotational pulse train using the interrupt signal outputs P1, P2. Numeral 422a is a step that operates following the step 421a, and determines whether or not a completion flag has been set in step 424a described later. Numeral 423a is a subroutine program described later referring to FIG. 5, and this program operates when step 422a determines NO. Numeral 424a is a step that operates following the subroutine program 423a, and sets an abnormality detection completion flag. Numeral 425a is a step that operates when step 422a determines YES, or following the mentioned step 424a, and by comparing a target position with a current position at the moment, determines whether or not generation of a forward rotational pulse train continues. When step 425a determines the continuation, the operation returns to step 421a.

Numeral 421b is a step that operates when step 420 determines a reverse rotation, and generates a reverse rotation pulse train using the interrupt signal outputs P1, P2. Numeral 422b is a step that operates following the step 421b, and determines whether or not the completion flag has been set in step 424b described later. Numeral 423b is a subroutine program described later referring to FIG. 6, and this program operates when step 422b determines NO. Numeral 424b is a step that operates following the subroutine program 423b, and sets the abnormality detection completion flag. Numeral 425b is a step that operates when step 422b determines YES or following the step 424b, and by comparing a target position with a current position at the moment, determines whether or not generation of the reverse rotation pulse train continues. When determining the continuation, the operation returns to step 421b.

Numeral 426 is a latency step (drive start delay confirmation means) that operates when the mentioned step 418 determines the value normal, or when the mentioned steps 425a, 425b determine the pulse generation not continued. The latency step 426 determines whether or not a drive stop time is over a predetermined value. Step 426 is repeatedly operated when the drive stop time does not reach a predetermined time. In addition, a drive stop time before starting again the drive of the stepping motor 101a or before switching the drive between the forward rotation and the reverse rotation, is normally set to be not less than the mentioned predetermined time. Therefore, it is not necessary to carry out any latency in step 426, and this step 426 mainly acts as the drive start delay confirmation means. Numeral 427 is a step that operates after passing the latency carried out in the step 426, and resets the completion flag which has been set in the mentioned step 424a or step 424b. Consequently, the operation proceeds to the mentioned end step 415 following the step 427.

Summing up the foregoing operations, steps 401 to 414 relate to abnormality detection at the time of return-to-origin operation and in the course of returning-to-origin, in which the power supply switch is turned on or turning off. In this first embodiment, the return-to-origin detecting switch 102d is provided as mentioned above. Therefore, by establishing that return-to-origin is normal both at the time of turning on or turning off the power supply switch, the stepping motor is normally at its origin position without bothering to conduct any return-to-origin operation at the time of turning on the power supply. Accordingly it is possible to promptly transit to a normal operation state, and only in the event that the stepping motor is not returned to its original position for some reason, such return-to-origin is conducted at the time of turning on the power supply. It can be determined that any abnormality occurs at the stepping motor 101a or in a driven machine system when the return-to-origin-detecting switch 102d does not act in spite of supplying sufficient reverse rotation pulses.

Steps on and after step 416 relate to a forward/reverse rotational drive and abnormality detection during the normal operation. However, at the time of restart after completing the forward rotation or reverse rotation in the normal operation, or at the time of changing a rotational direction, a pause provided by step 426 is assured. Furthermore, the abnormality detection by the subroutine programs 423a or 423b is carried out so as to detect presence or absence of the initial surge voltage immediately after the pause.

Figure 5:
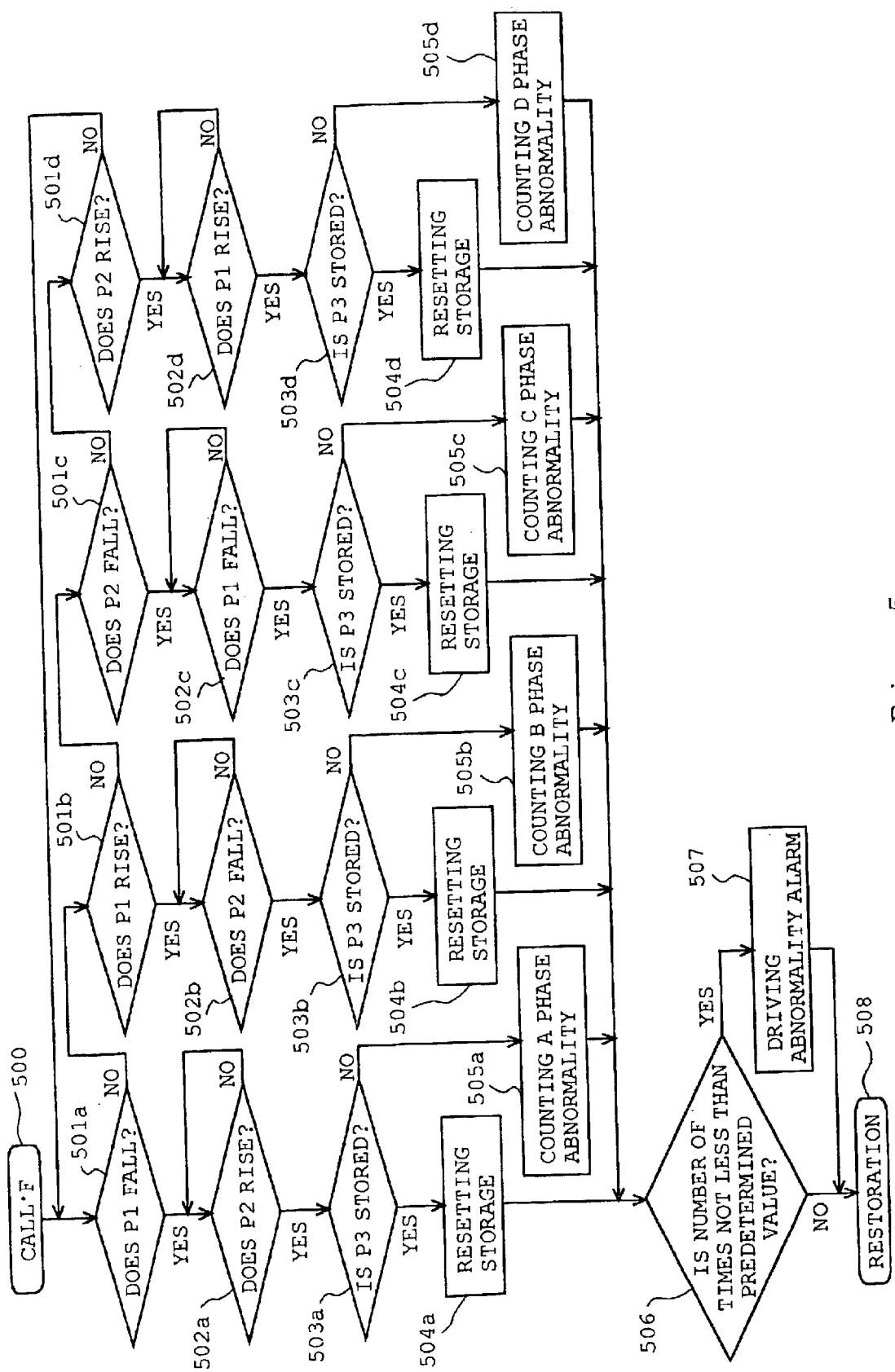
FIG. 5 is a flowchart for explaining an abnormality detecting operation during a forward rotation of the stepping motor of FIG. 1.

With reference to FIG. 5 showing a flowchart for explaining an abnormality detection operation during a forward rotation of FIG. 1, numeral 500 is an operation start step of the subroutine program to be activated when step 422a of FIG. 4 determines NO. Numeral 501a is a step that operates following the step 500, and determines whether or not the interrupt signal output P1 falls. Numeral 501b is a step that operates when step 501a determines NO, and determines whether or not the interrupt signal output P1 rises. Numeral 501c is a step that operates when step 501b determines NO, and determines whether or not the interrupt signal output P2 falls. Numeral 501d is a step that operates when step 501c determines NO, and determines whether or not the interrupt signal output P2 rises. Further when step 501d determines NO, the operation returns to step 501a. Thus steps 501a to 501d are those for detecting the rising or falling of the interrupt signal P1 or P2 while conducting circulation and repetition of the operations.

Numeral 502a is a step that operates when step 501a determines YES, and conducts a standby operation until the interrupt signal P2 rises according to the time chart of FIG. 2. Numeral 502b is a step that operates when step 501b determines YES, and conducts a standby operation until the interrupt signal P2 falls according to the time chart of FIG. 2. Numeral 502c is a step that operates when step 501c determines YES, and conducts a standby operation until the interrupt signal P1 falls according to the time chart of FIG. 2. Numeral 502d is a step that operates when step 501d determines YES, and conducts a standby operation until the interrupt signal P1 a rises according to the time chart of FIG. 2.

Numeral 503a is step that operates when step 502a determines YES, and determines whether or not the synthetic state detection signal P3 is set in the mentioned flip-flop circuit 125. Numeral 503b is step that operates when step 502b determines YES, and determines whether or not the synthetic state detection signal P3 is set in the flip-flop circuit 125. Numeral 503c is a step that operates when step 502c determines YES, and determines whether or not the synthetic state detection signal P3 is set in the flip-flop circuit 125. Numeral 503d is a step that operates when step 502d determines YES, and determines whether or not the synthetic state signal P3 is set in the flip-flop circuit 125.

Numerals 504a to 504d are reset steps (reset means). Among these reset steps, numeral 504a is a step that operates when step 503a determines YES, and resets the synthetic state detection signal P3 stored in the flip-flop circuit 125. Numeral 504b is a step that operates when step 503b determines YES, and resets the synthetic state detection signal P3 stored in the flip-flop circuit 125. Numeral 504c is a step that operates when step 503c determines YES, and resets the synthetic state detection signal P3 stored in the flip-flop circuit 125. Numeral 504d is a step that operates when step 503d determines YES, and resets the synthetic state detection signal P3 stored in the flip-flop circuit 125.

Numerals 505a to 505d are abnormality detection number counting steps (individual determination storage means= abnormality counting storage means for each phase). Among these steps, numeral 505a is a step that operates when step 503a determines NO, and adds and counts the number of times of detecting an abnormality using an A phase abnormality number counter, not shown. Numeral 505b is a step that operates when 503b determines NO, and adds and counts the number of times of detecting abnormality using a B phase abnormality number counter, not shown. Numeral 505c is a step that operates when step 503c determines NO, and adds and counts the number of times of detecting abnormality using a C phase abnormality number counter, not shown. Numeral 505d is a step that operates when step 503d determines NO, and adds and counts the number of times of detecting abnormality using a D phase abnormality number counter, not shown. A fact that any synthetic state detecting signal P3 is not generated is extracted for each phase and stored.

Numeral 506 is a step (count determination means) that operates following the steps 504a to 504d or the steps 505a to 505d, and determines whether or not any of the number of times of detecting abnormality counted respectively in steps 505a to 505d, exceeds a predetermined value, or whether or not a total sum of the number of times of detecting abnormality counted in the mentioned steps 505a to 505d, exceeds a predetermined value. Numeral 507 is a step (abnormality alarm display means) that operates when step 506 determines YES, and generates the drive output DR2 for the abnormality alarm display 107. Numeral 508 is a return label that operates when step 506 determines NO, or following the step 507, and proceeds to step 424a in FIG. 4.

The mentioned operations are summarized as follow. The operation in the steps 501a to 505a is a process that detects any abnormality in the A phase magnetic field coil 103a system, and adds and counts the number of times of detecting abnormality for each forward rotation start operation of the stepping motor 101a. The operation in the steps 501b to 505b is a process that detects any abnormality in the B phase magnetic field coil 103b system, and adds and counts the number of times of detecting abnormality for each forward rotation start operation of the stepping motor 101a. The operation in the steps 501c to 505c is a process that detects any abnormality in the C phase magnetic field coil 103c system, and adds and counts the number of times of detecting abnormality for each forward rotation start operation of the stepping motor 101a. The operation in the steps 501d to 505d is a process that detects any abnormality in the D phase magnetic field coil 103d system, and adds and counts the number of times of detecting abnormality for each forward rotation start operation of the stepping motor 101a. In each system, disconnection and short circuit abnormalities in the magnetic filed coil, the open/close elements, and the wiring are synthesized, and detected in an inseparable manner. Furthermore, the number of times provided by the abnormality count counter for each phase is added and counted not only in the mentioned step 505a to 505d, but also they are counted in steps 605a to 605d of FIG. 6. Accordingly a total current value, which is subject to comparison in step 506, is obtained by adding up both values.

Figure 6:
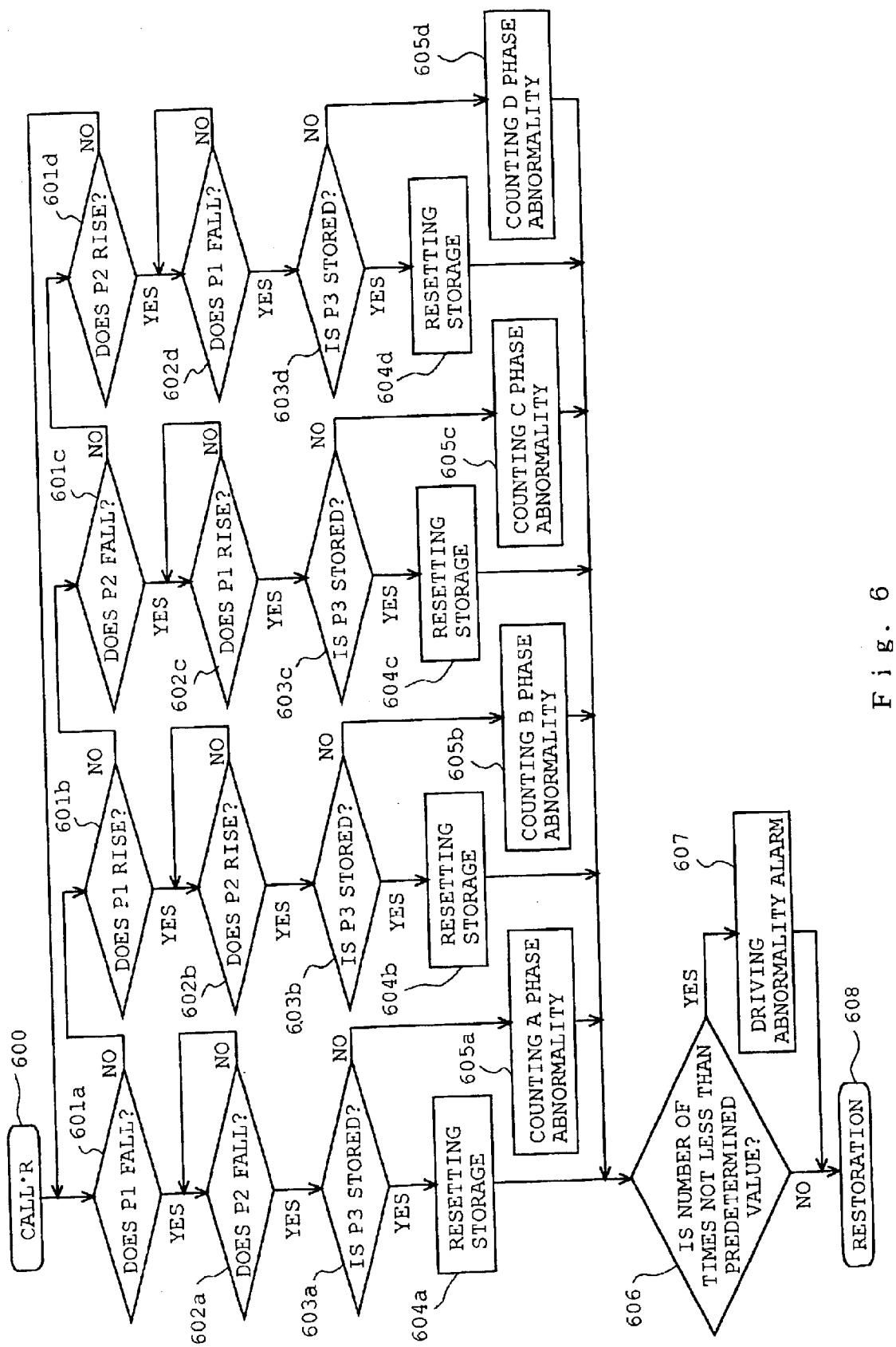
FIG. 6 is a flowchart for explaining an abnormality detecting operation during a reverse rotation of the stepping motor of FIG. 1.

With reference to FIG. 6 showing a flowchart for explaining an abnormality detection operation in the reverse rotation according to the first embodiment of FIG. 1, numeral 600 is an operation start step of the subroutine program, which is activated when step 422b in FIG. 4 determined NO, or following step 406. Numeral 601a is a step that operates following the step 600, and determines whether or not the interrupt signal output P1 falls. Numeral 601b is a step that operates when step 601a determines NO, and determines whether or not the interrupt signal output P1 rises. Numeral 601c is a step that operates when step 601b determines NO, and determines whether or not the interrupt signal output P2 falls. Numeral 601d is a step that operates when step 601c determines NO, and determines whether or not the interrupt signal output P2 rises. When step 601d determines NO, the operation returns to step 601a. Thus steps 601a to 601d are those for detecting the rising or falling of the interrupt signals P1 or P2 while conducting circulation and repetition of the operations.

Numeral 602a is a step that operates when step 601a determines YES, and carries outs a standby operation until the interrupt signal P2 falls according to the time chart of FIG. 3. Numeral 602b is a step that operates when step 601b determines YES, and carries out a standby operation until the interrupt signal P2 rises according to the time chart of FIG. 3. Numeral 602c is a step that operates when step 601c determines YES, and carries out a standby operation until the interrupt signal P1 rises according to the time chart of FIG. 3. Numeral 602d is a step that operates when step 601d determines YES, and carries out the standby operation until the interrupt signal P1 falls according to the time chart of FIG. 3.

Numeral 603a is a step that operates when step 602a determines YES, and determines whether or not the synthetic state detection signal P3 is set in the mentioned flip-flop circuit 125 acting as temporary storage means. Numeral 603b is a step that operates when step 602b determines YES, and determines whether or not the synthetic state detection signal P3 is set in the flip-flop circuit 125. Numeral 603c is a step that operates when step 602c determines YES, and determines whether or not the synthetic state detection signal P3 is set in the flip-flop circuit 125. Numeral 603d is a step that operates when step 602d determines YES, and determines whether or not the synthetic state detection signal P3 is set in the flip-flop circuit 125.

Numerals 604a to 604d are reset steps (reset means) Among these steps, numeral 604a is a step that operates when step 603a determines YES, and resets the synthetic state detection signal P3 stored in the flip-flop circuit 125. Numeral 604b is a step that operates when step 603b determines YES, and resets the synthetic state detection signal P3 stored in the flip-flop circuit 125. Numeral 604c is a step that operates when step 603c determines YES, and resets the synthetic state detection signal P3 stored in the flip-flop circuit 125. Numeral 604d is a step that operates when step 603d determines YES, and resets the synthetic state detection signal P3 stored in the flip-flop circuit 125.

Numerals 605a to 605d are abnormality detection number counting steps (individual determination storage means). Among these steps, numeral 605a is a step that operates when step 603a determines NO, and adds and counts the number of times of detecting abnormality using the A phase abnormality count counter, not shown. Numeral 605b is a step that operates when step 603b determines NO, and adds and counts the number of times of detecting abnormality using the B phase abnormality count counter, now shown. Numeral 605c is a step that operates when step 603c determines NO, and adds and counts the number of times of detecting abnormality using the C phase abnormality count counter, not shown. Numeral 605d is a step that operates when step 603d determines NO, and adds and counts the number of times of detecting abnormality using the D phase abnormality count counter, not shown. Thus a fact that the synthetic state detection signal P3 is not generated, is to be separated and stored for each phase in the mentioned steps 605a to 605d.

Numeral 606 is a step (count determination means) that operates following the steps 604a to 604d or steps 605a to 605d, and determines whether or not any of the number of times of detecting the abnormality, which are counted in steps 605a to 605d, exceeds a predetermined value, or whether or not a total sum of the number of times of detecting the abnormality, which are counted in steps 605a to 605d, exceeds a predetermined value. Numeral 607 is a step (abnormality alarm display means) that operates when step 606 determines YES, and generates the drive output DR2 for the mentioned abnormality alarm display 107. Numeral 608 is a return label that operates when step 606 determines NO, or following the step 607, and proceeds to step 424b or step 408 of FIG. 4.

The mentioned operations are summarized as follows. The operation in step 601a to step 605a is a process that detects any abnormality in the A phase magnetic field coil 103a system, and adds and counts the number of times of detecting abnormality for each start operation in reverse rotation of the stepping motor 101a. The operation in step 601b to step 605b is a process that detects any abnormality in the B phase magnetic field coil 103b system, and adds and counts the number of times of counting abnormality for each start operation in reverse rotation of the stepping motor 101a. The operation in step 601c to step 605c is a process that detects any abnormality in the C phase magnetic field coil 103c system, and adds and counts the number of times of counting abnormality for each start operation in reverse rotation of the stepping motor 101a. The operation in step 601*d* to step 605*d* is a process that detects any abnormality in the D phase magnetic field coil 103*d* system, and adds and counts the number of times of counting abnormality for each start operation in reverse rotation of the stepping motor 101*a*. In each system, disconnection and short circuit abnormalities in the magnetic filed coil, the open/close elements, and the wiring are synthesized, and detected in an inseparable manner. Furthermore, the number of times provided by the abnormality count counter for each phase is added and counted not only in the mentioned step 505*a* to 505*d*, but also they are counted in steps 605*a* to 605*d* of FIG. 6. Accordingly a total current value, which is subject to comparison in step 606, is obtained by adding up both values.

Considering the above description, action and operation referring to FIG. 1 is summarized as follows. A rotational amount of the stepping motor 101*a* sequentially driven by the pulse train generated by the open/close elements 114*a* to 114*d* is measured by means of the current value counter 132 for reversibly counting the generated pulse train. Then a reversible drive is carried out in accordance with a relative deviation from a target position. A return-to-origin position of the stepping motor 101*a* is detected by means of the return-detecting switch 102*d*, and at this time the mentioned current value counter 132 is reset. When, however, the return-detecting switch 102*d* does not act, despite that a return drive pulse sufficient for coming in contact with the stop position 102*c* to stop was given, the abnormality alarm display 107 is put in operation.

When the open/close elements 114*a* to 114*d* carry out an interruption after feeding power to the magnetic field coils 103*a* to 103*d*, a surge voltage is generated at the terminals A1 to D1. In the event, however, that the open/close elements cannot interrupt a current due to a short circuit fault, or the open/close elements cannot apply any current due to any abnormality in open-circuit, any interrupting surge voltage is not generated. Also in the case event that the magnetic field coils are in any disconnection and short circuit, or any disconnection or earth fault in wiring path (fault contact of the wiring between the terminals A1 to D1 and the terminals A2 to D2 with a negative side terminal of the on-vehicle battery 104) or accidental rise up in power source voltage (fault contact of the wiring between the terminals A1 to D1 and the terminals A2 to D2 with a positive side terminal of the on-vehicle batter 104) takes place, the interrupt surge voltage is not generated, either.

To reduce the number of the control inputs for the microprocessor 110*a*, the surge voltages in respective phases are connected in parallel using the OR connecting diode 116. However, it is necessary to identify which phase is abnormal when any abnormality occurs. Furthermore, when the stepping motor 101*a* rotates at a high speed, a logical addition output from the diode 116 comes to be at a seamless and continuous signal level, hence a problem exits in that separation for each phase cannot be carried out. For example, a surge voltage 200*a* in FIG. 2 is the one generated by the magnetic field coil 103*a* conforming to the fall ③ in the interrupt signal output P1, and this surge voltage 200*a* is to be stored and then reset conforming to the rise ④ in the interrupt signal P2. However, when the stepping motor 101*a* rotates at a high speed, a phenomenon occurs such that waveform of the surge voltage 200*a* continues beyond the time of rise ④ of the interrupt signal P2.

As a result, even if no surge voltage waveform 200*d* is generated, a problem exists in that the flip-flop circuit 125 conducts a false storage apparently as if the surge voltage 200*d* were generated based on an end waveform of the surge voltage 200*a*. To avoid this problem, it may be an idea to decrease a detection sensitivity captured by means of the transistor 118 by making resistance of the emitter resistor 119 small and making that of the resistor 117 large. However, there still remains a problem in that the surge voltage cannot be detected when a power supply voltage of the on-vehicle battery 104 is low. For the reasons mentioned above, abnormality detection for each phase is carried out at an initial stage of starting the stepping motor 101*a*, or at the time of returning to the origin in the operation at a low speed. Thus, any abnormality detection during driving at a high speed is avoided.

Embodiment 2

1. Detailed Description of Constitution According to Embodiment 2

Figure 7:
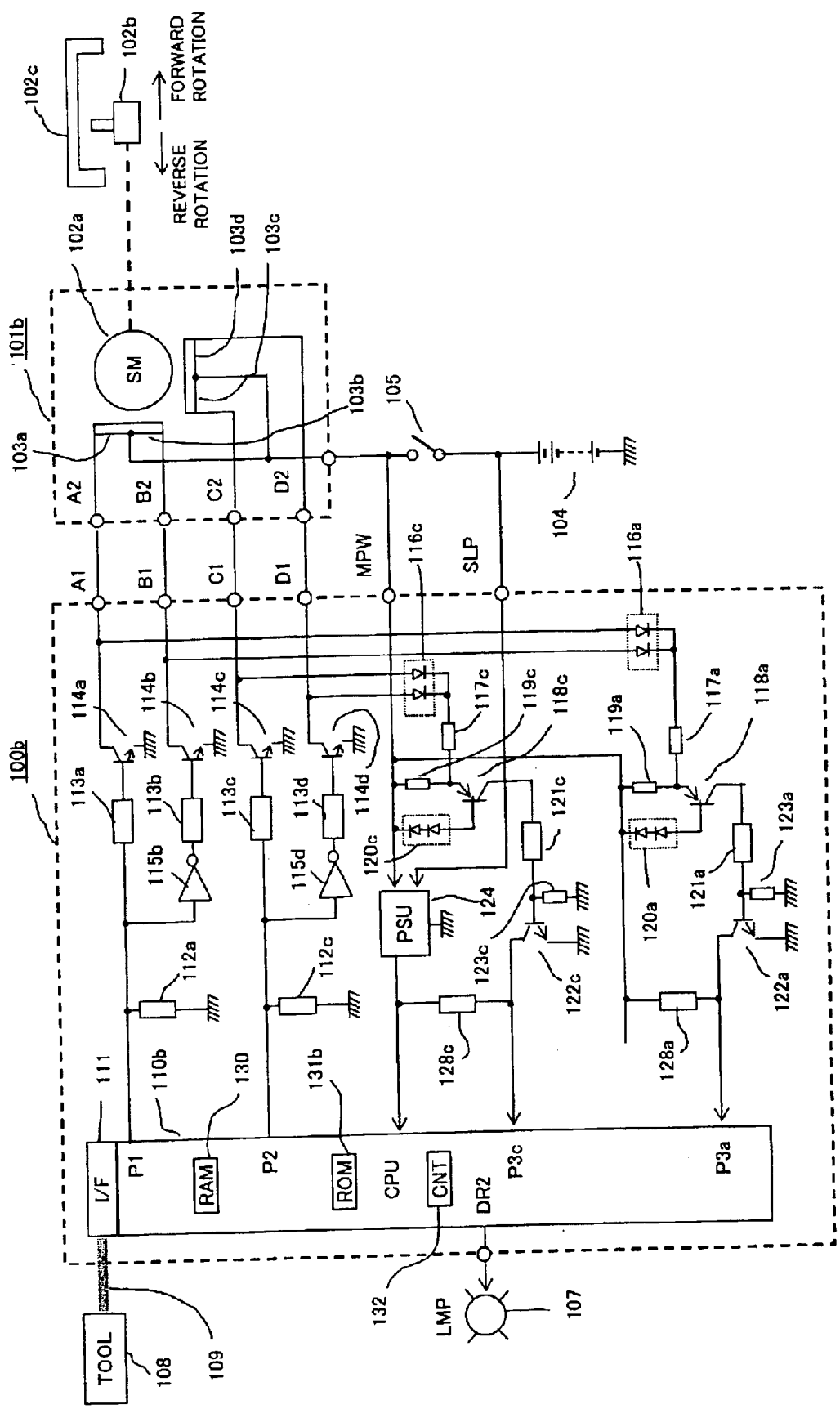
FIG. 7 is a block diagram showing an abnormality detector for motor drive system according to a second embodiment of the invention.

FIG. 7 is a block diagram showing another embodiment according to the invention. Differences from the first embodiment of FIG. 1 are primarily described below. With reference to FIG. 7, numeral 100*b* designates an abnormality detector that contains therein a microprocessor 110*b*, and controls driving a stepping motor 101*b* connected outside. Numeral 102*a* designates a rotor of the mentioned stepping motor 101*b*. In this second embodiment, the return-detecting switch 102*d* shown in FIG. 1 is not provided. Moreover, the power supply relay 106*a* shown in FIG. 1 is not used, and the abnormality detector 100*b* is directly power-fed from the on-vehicle battery 104, or fed via the power supply switch 105.

As for the internal constitution of the abnormality detector 114*b*, the collector terminals of the open/close elements 114*a*, 114*b*, 114*c*, 114*d* are connected to the connector terminals A1, B1, C1, D1 and drive the magnetic field coils 103*a*, 103*b*, 103*c*, 103*d*. The magnetic field coils 103*a* and 103*b* are connected to a resistor 117*a* via an OR connecting diode 116*a*, and the magnetic field coils 103*c* and 103*d* are connected to a resistor 117*c* via an OR connecting diode 116*c*.

Numeral 118*a* designates a transistor that is connected to the power supply terminal MPW via an emitter resistor 119*a*, and connected to a cathode side of the OR connecting diode 116*a* via the mentioned resistor 117*a*. Numeral 120*a* designates a dropper diode that is connected between the base terminal of the transistor 118*a* and the power supply terminal MPW. Numeral 121*a* designates a base resistor that is connected to the collector terminal of the transistor 118*a*, and drives a transistor 122*a*. Numeral 123*a* designates a ballast resistor connected between the base/emitter terminals of the transistor 122*a*. Numeral 128*a* designates a pull-up resistor connected between the collector of the transistor 122*a* and the power supply terminal MPW. Numeral P3*a* designates an interrupt input to the microprocessor 110*b*. The interrupt input P3*a* stores information that the output from the transistor 122*a* has come to a logical level of "0" in first storage means of the RAM memory 130.

Numeral 118*c* designates a transistor connected to the power supply terminal MPW via an emitter resistor 119*c*, and connected to a cathode side of the OR connecting diode 116*c* via the mentioned resistor 117*c*. Numeral 120*c* designates a dropper diode connected between the base terminal of the transistor 118*c* and the power supply terminal MPW. Numeral 121*c* designates a base resistor that is connected to the collector terminal of the mentioned transistor 118*c*, and drives the transistor 122*c*. Numeral 123*c* designates a ballast resistor connected between the base/emitter terminals of the transistor 122*c*. Numeral 128*c* designates a pull-up resistor connected between the collector of the transistor 122*c* and a power supply terminal MPW. Numeral P3*c* designates an interrupt input to the microprocessor 110*b*. The mentioned interrupt input P3c stores information that output from the mentioned transistor 122c has comes to a logical level of "0", in second storage means of the RAM memory 130. In addition, the mentioned microprocessor 110b carries out control operation or communication with the mentioned external tool 108 according to the a program stored in a ROM memory 131b.

2. Detailed Description of Action and Operation of Embodiment 2

Figure 8:
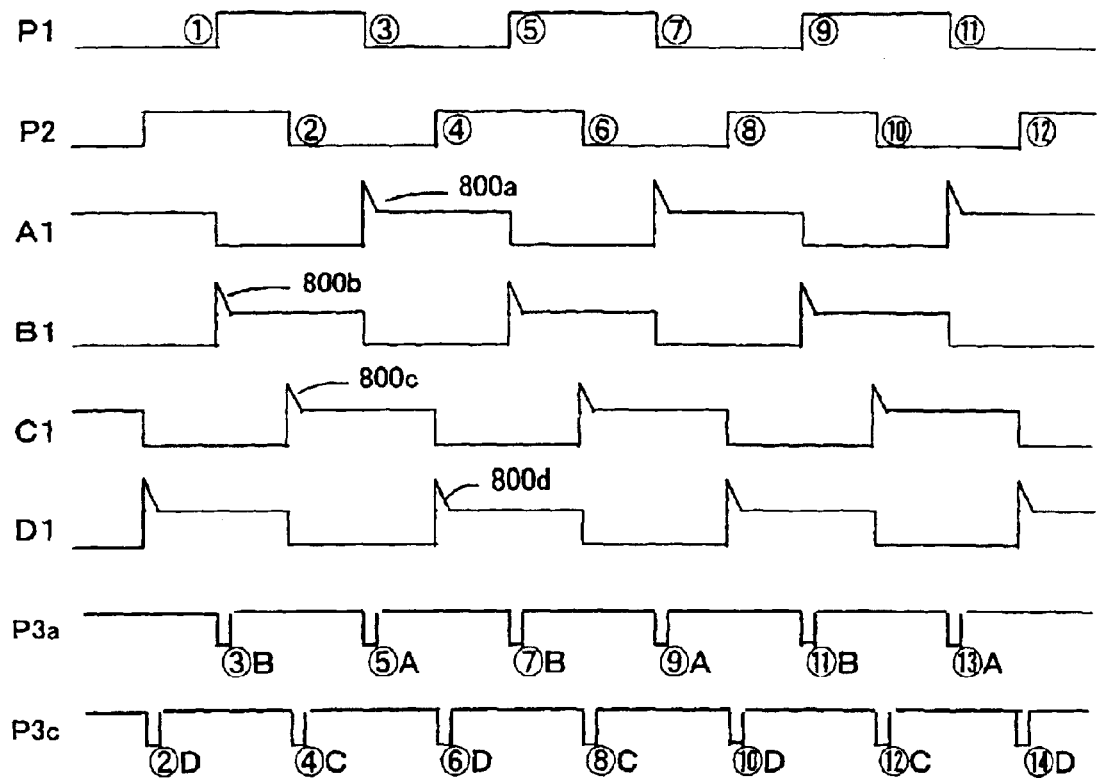
FIG. 8 is a time chart for explaining a forward rotational operation of the stepping motor of FIG. 7.

In the second embodiment according to the invention arranged as shown in FIG. 1, operation thereof is described first with reference to a time chart of the forward rotational operation of the stepping motor 101a shown in FIG. 2. Referring to FIG. 8, rising edges of an interrupt signal output P1 from the microprocessor 110b are indicated by numerals ①⑤⑨, and falling edges thereof are indicated by numerals ③⑦⑫. Furthermore, rising edges of an interrupt signal output P2 from the microprocessor 110b are indicated by numerals ④⑧⑫, and falling edges thereof are indicated by numerals ②⑥⑩. The interrupt signal output P2 is kept at a level of "H" at the moment of the rising edges ①⑤⑨ of the interrupt signal output P1. The interrupt signal output P2 is kept at a level of "L" at the moment of the falling edges ③⑦⑪ of the interrupt signal output P1. These interrupt signal outputs represent a forward rotation state.

In FIG. 8, numerals A1, B1, C1, D1 designate voltage waveforms of the collector terminals of the open/close elements 114a, 114b, 114c, 114d, that is, voltage waveforms of the connector terminals A1, B1, C1, D1 of the abnormality detector 100b. When the magnetic field coils 103a, 103b, 103c are power-conducted, these voltage waveforms are kept at "L" level: while when power conduction is interrupted, the waveforms are kept at "H" level.

Numeral 800a to 800d designate surge voltages acting as an individual state detection signal. Among these surge voltages, numeral 800a designates a surge voltage waveform when power conduction through the magnetic field coil 103a is interrupted at the falling edge ③ of the interrupt signal output P1. Numeral 800b designates a surge voltage waveform when power conduction through the magnetic field coil 103b is interrupted at the rising edge ① of the interrupt signal output P1. Numeral 800c designates a surge voltage waveform when power conduction through the magnetic field coil 103c is interrupted at the falling edge ② of the interrupt signal output P2. Numeral 800d designates a surge voltage waveform when power conduction through the magnetic field coil 103d is interrupted at the rising edge ④ of the interrupt signal output P2.

Current produced by the surge voltages 800a, 800b is absorbed in the on-vehicle battery 104 via the OR connecting diode 116a of FIG. 7 through the resistor 117a, the emitter resistor 119a and the power supply switch 105. A part of the current, however, flows in the dropper diode 120a and drives the transistor 118a, and therefore the transistor 122a is driven via the transistor 118a and the base resistor 121a.

As a result, the collector terminal of the transistor 122a is kept at "L" level acting as a signal that indicates normality as long as the surge voltage is generated. This signal is fetched in the microprocessor 110b as a first synthetic state detection signal P3a.

Current produced by the surge voltages 800c, 800d is absorbed in the on-vehicle battery 104 via the OR connecting diode 116c of FIG. 7 through the resistor 117c, the emitter resistor 119c and the power supply switch 105. A part of the current, however, flows in the dropper diode 120c and drives the transistor 118c, and therefore the transistor 122c is driven via the transistor 118c and the base resistor 121c.

As a result, the collector terminal of the transistor 122c is kept at "L" level acting as the signal that indicates normality as long as the surge voltage is generated. This signal is fetched in the microprocessor 110b as a second synthetic state detection signal P3c. In addition, for example, numeral ③B means a temporary storage signal provided by a B phase surge voltage and read out at a timing of ③. Timing for storage is stored by an interrupting operation immediately after the rise ① of the interrupt signal output P1.

Figure 9:
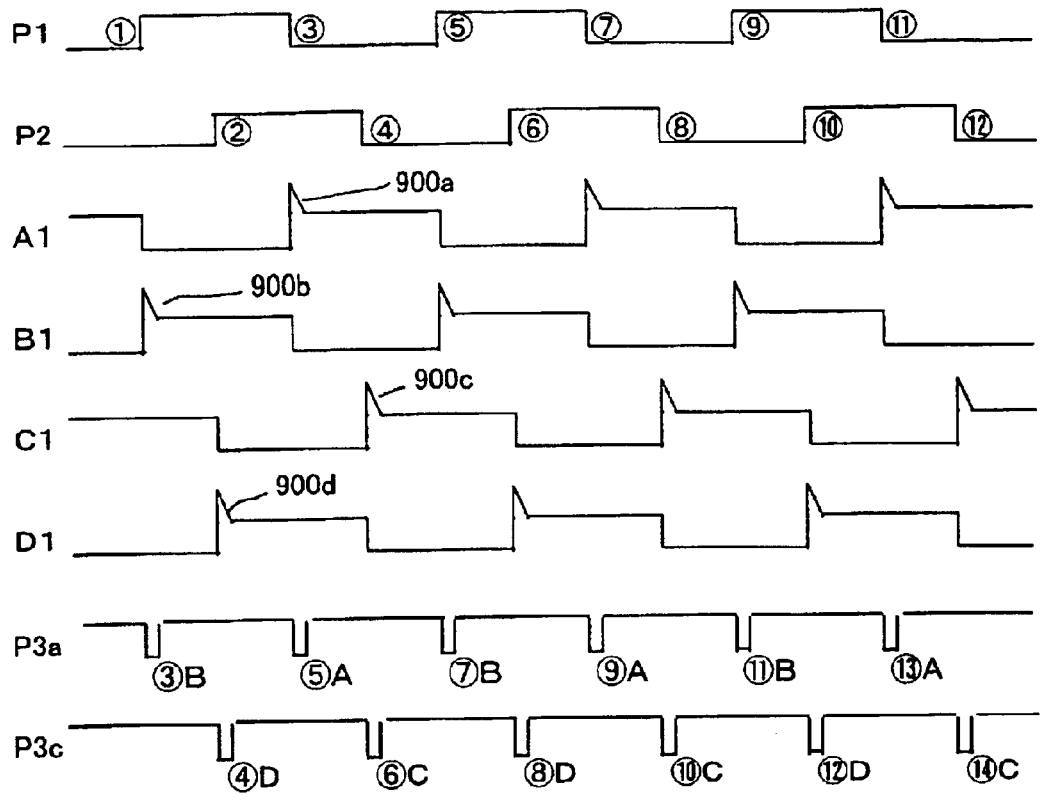
FIG. 9 is a time chart for explaining a reverse rotational operation of the stepping motor of FIG. 7.

In the second embodiment according to this invention arranged as shown in FIG. 1, the action and operation thereof is described with reference to a chart of a reverse rotational operation shown in FIG. 9. With reference to FIG. 9, rising edges of the interrupt signal output P1 from the microprocessor 110b are indicated by numerals ①⑤⑨, and falling edges thereof are indicated by numerals ③⑦⑪. Further, falling edges of the interrupt signal output P2 from the microprocessor 110b are indicated by numerals ④⑧⑫, and rising edges thereof are indicated by numerals ②⑥⑪. The interrupt signal output P2 is kept at "L" level at the moment of the rising edges ①⑤⑨ of the interrupt signal output P1: while the interrupt signal output P2 is kept at "H" level at the moment of the falling edges ③⑦⑪ of the interrupt signal output P1. These interrupt signal outputs represent a reverse rotation state.

Numerals A1, B1, C1, D1 in FIG. 9 show voltage waveform of the collect or terminal of the open/close elements 114a, 114b, 114c, 114d, that is, voltage waveform of the connector terminals A1, B1, C1, D1 of the abnormality detector 100b. The voltage waveforms are kept at "L" level when power conduction is going on through the magnetic field coils 103a, 103b, 103c, 103d: while they are at "H" level when power conduction through the magnetic field coils are interrupted.

Numeral 900a to 900d designate surge voltages acting as individual state detection signal. Among the serge voltages, numeral 900a designates a surge voltage waveform when power conduction through the magnetic field coil 103a is interrupted at the falling edge ③ of the interrupt signal output P1. Numeral 900b designates a surge voltage waveform when power conduction through the magnetic field coil 103b is interrupted at the rising edge ① of the interrupt signal output P1. Numeral 900c designates a surge voltage waveform when power conduction through the magnetic field coil 103c is interrupted at the falling edge ④ of the interrupt signal output P2. Numeral 900d designates a surge voltage waveform when power conduction through the magnetic field coil 103d is interrupted at the rising edge ① of the interrupt signal output P2.

Current produced by the surge voltages 900a, 900b is absorbed in the on-vehicle battery 104 via the OR connecting diode 116a of FIG. 7 through the resistor 117a, the emitter resistor 119a and the power supply switch 105. A part of the current, however, flows in the dropper diode 120a and drives the transistor 118a, and therefore the transistor 122a is driven via the transistor 118a and the base resistor 121a. As a result, the collector terminal of the transistor 122a is kept "L" level acting as a signal that indicates normality when the surge voltage is generated. This signal is fetched in the microprocessor 101b as a first synthetic state detection signal P3a.

Current produce by the surge voltages 900c, 900d is absorbed in the on-vehicle battery 104 via the OR connecting diode 116c of FIG. 7 through the resistor 117c, the emitter resistor 119c and the power supply switch 105. A part of the current, however, flows in the dropper diode 120c and drives the transistor 118c, and therefore the transistor 122c is driven via the transistor 118c and the base resistor 121c.

As a result, the collector terminal of the transistor 122c is kept at "L" level acting as the signal indicating normality when the surge voltage is generated. This signal is fetched in the microprocessor 110b as a second synthetic state detection signal P3c. In addition, for example, numeral ③B means a temporary storage signal provided by a B phase surge voltage and read out at a timing of ③. Timing for storage is stored by an interrupting operation immediately after the rise ① of the interrupt signal output P1.

Figure 10:
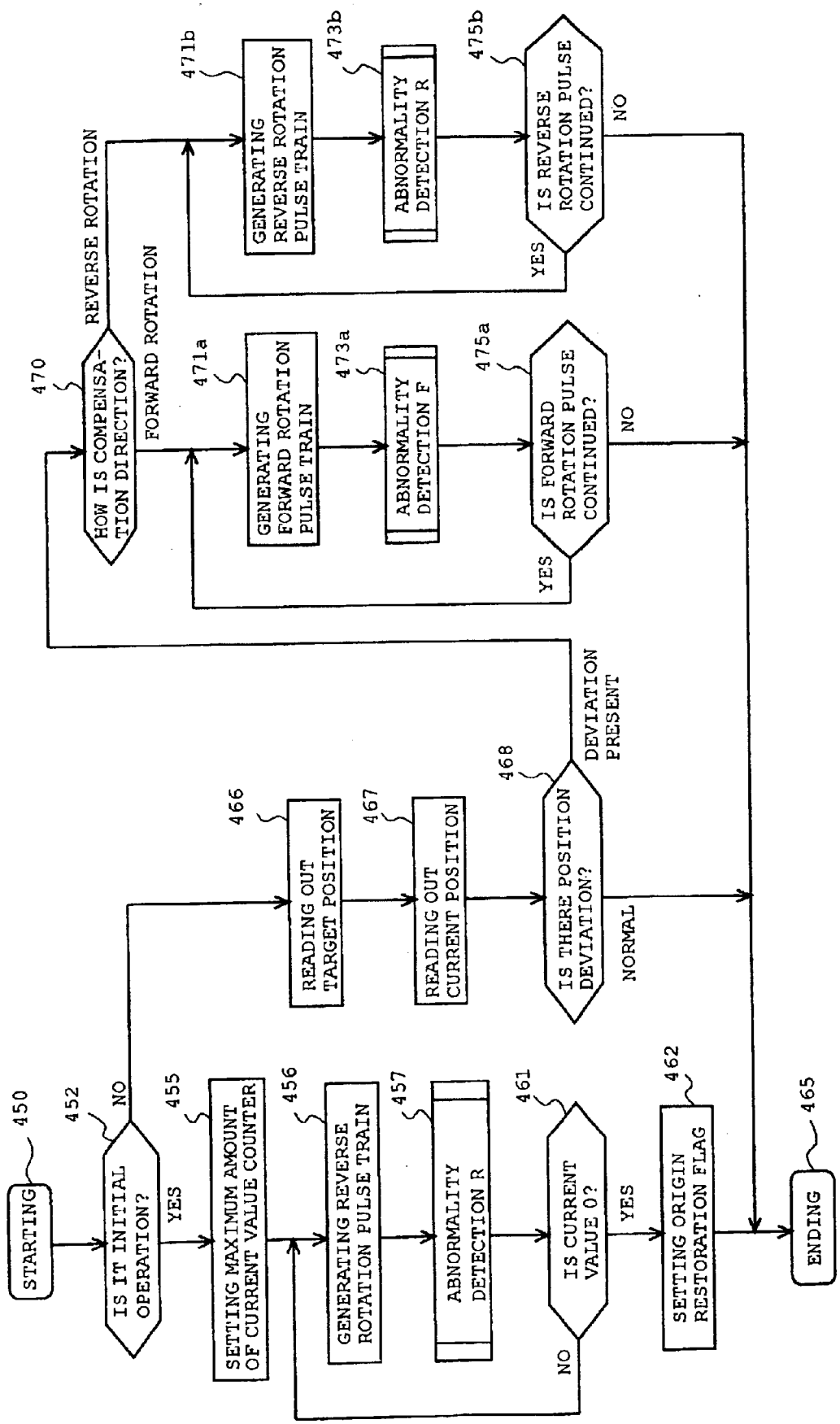
FIG. 10 is a flowchart for explaining the entire operation of FIG. 7.

In FIG. 10 showing a flowchart for explaining the entire operation of the second embodiment in FIG. 7, numeral 450 is an operation start step of the microprocessor 110b. Numeral 452 is a determination step that operates following the step 450, and determines whether or not it is an initial operation, which in turn determined depending on whether or not a flag described later in step 462 is set. Numeral 455 is a step that operates when step 452 determines YES, and sets the current value counter 132 of FIG. 7 to a maximum value. Numeral 456 is a step (return-to-origin operation control means) that operates following the step 455, and generates the interrupt signal outputs P1, P2 as reverse rotation pulse train for returning to the origin. Numeral 457 is a subroutine program described hereinafter referring to FIG. 12, and which operates following the step 456. Numeral 461 is a step that operates following the subroutine program 457, and determines whether or not a current value of the current value counter 132 has come to 0. The operation returns to step 456 as long as a current value of the current value counter 132 comes to 0 in the foregoing step 461. In addition, when the current value comes to 0, the operation proceeds to step 462, where a return-to-origin flag is set.

Numeral 466 is a step that operates when step 452 determines NO as well as the return-to-origin operation has completed, and reads out a target rotational position of the steeping motor 101b from the drive control means, not shown. Numeral 467 is a step that operates following the step 466, and reads out a current value of the current value counter 132. Numeral 468 is a step that operates following the foregoing step 467, and compares the target position read out in the mentioned step 466 with the current value read out in step 467. Numeral 465 is an operation end step that ends the operation when step 468 determines a positional deviation normal, or following the step 462. The operation start step 450 is activated again in the operation end step 465, thus the control operation is carried out repeatedly.

Numeral 470 is a step that operates when step 468 determines a positional deviation excessively large, and determines a compensating rotational direction depending on plus or minus of the positional deviation. Numeral 471a is a step that operates when step 470 determines a forward rotation, generates a forward rotation pulse train using the interrupt signal outputs P1, P2. Numeral 473a is a subroutine program, described later referring to FIG. 11, and this program 473a operates following the step 471a. Numeral 475a is a step that operates following the subroutine program 473a, compares a target position with a current position at the moment, and determines whether or not generation of the forward rotation pulse train continues. When step 475a determines the continuation of pulse generation, the operation returns to step 471a: while when step 475a determines stopping the continuation, the operation proceeds to the end step 465.

Numeral 471b is a step that operates when step 470 determines a reverse rotation, and generates a reverse rotation pulse train using the interrupt signal outputs P1, P2. Numeral 473b is a subroutine program, described later referring to FIG. 12, and this program 473b operates following step 471b. Numeral 475b is a step that operates following the subroutine program 473b, compares a target position with a current position at the moment, and determines whether or not generation of the reverse rotation pulse train continues. When the foregoing step 475b determines the continuation, the operation returns to step 471b: while when the mentioned step 475b determines stopping the continuation, the operation proceeds to the end step 465.

Summing up the foregoing operations, the operations in the step 452 to step 462 relate to the return-to-origin operation at the time of turning power on, and to the abnormality detection in the process of returning to the origin. The steps on and from step 466 relate to the forward/reverse rotation drive and to the abnormality detection during the normal operation. In addition, the subroutine programs 473a or 473b, 457 for detecting an abnormality is described hereinafter referring to FIGS. 11, 12.

Figure 11:
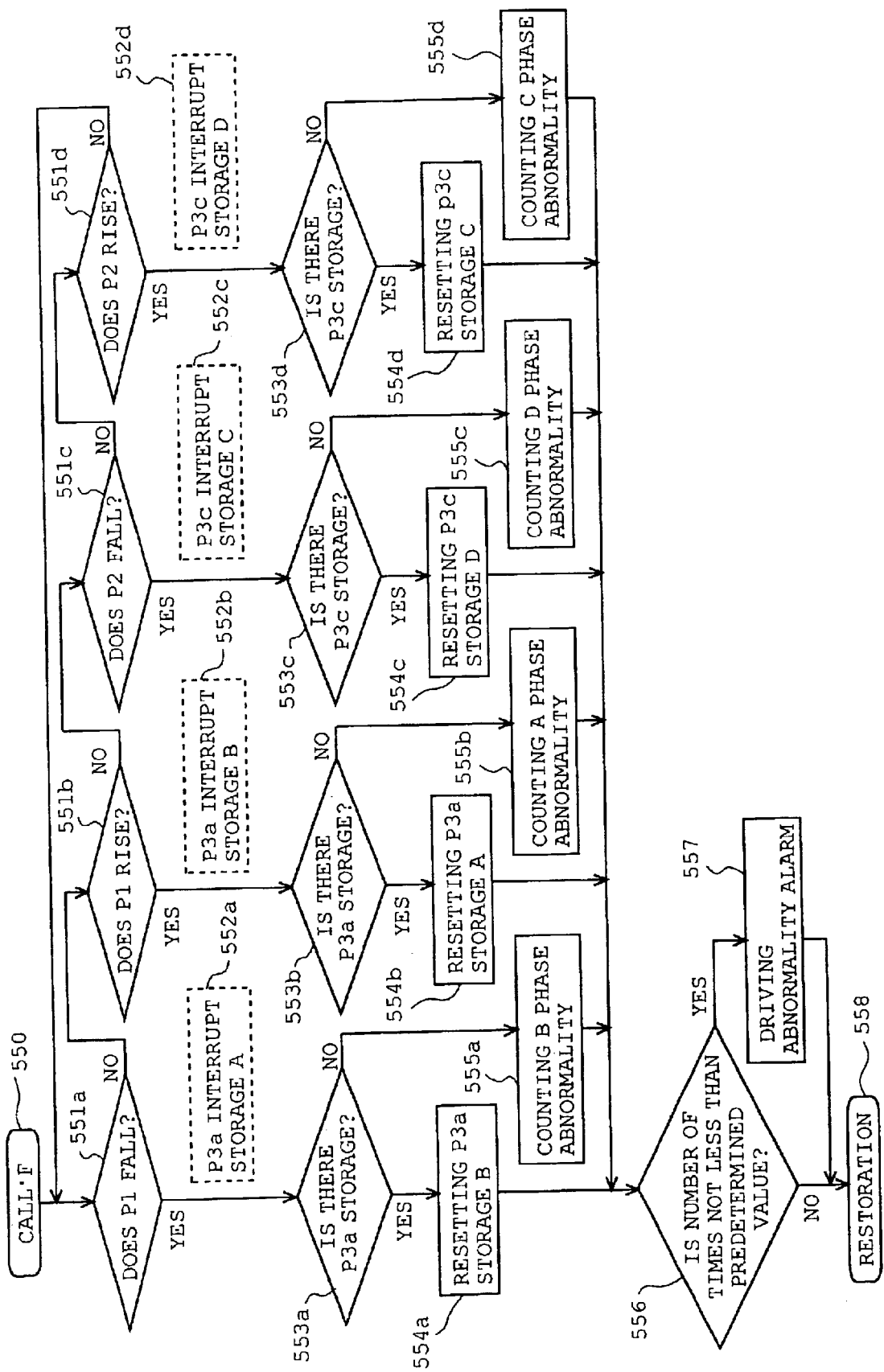
FIG. 11 is a flowchart for explaining an abnormality detecting operation during the forward rotation of the stepping motor of FIG. 7.

With reference to FIG. 11 showing a flowchart for explaining an abnormality detection operation during a forward rotation of FIG. 7, numeral 550 is an operation start step of the subroutine program to be activated following the step 471a of FIG. 10. Numeral 551a is a step that operates following the step 500, and determines whether or not the interrupt signal output P1 falls. Numeral 551b is a step that operates when step 551a determines NO, and determines whether or not the interrupt signal output P1 rises. Numeral 551c is a step that operates when step 551b determines NO, and determines whether or not the interrupt signal output P2 falls. Numeral 551d is a step that operates when step 551c determines NO, and determines whether or not the interrupt signal output P2 rises. Further when step 551d determines NO, the operation returns to step 551a. Thus steps 551a to 551d are those for detecting the rising or falling of the interrupt signal P1 or P2 while conducting circulation and repetition of the operations.

Numeral 552 is first temporary storage means for storing, via the input terminal P3a, a fact that a current of the magnetic field coil 103a has been interrupted with the fall of the interrupt signal P1, and that an A phase surge voltage has been generated. Numeral 552b is first temporary storage means for storing, via the input terminal P3a, a fact that a current of the magnetic field coil 103b has been interrupted with the rise of the interrupt signal P1 and that a B phase surge voltage has been generated. Numeral 552c is second temporary storage means for storing, via the input terminal P3c, a fact that a current of the magnetic field coil 103c has been interrupted with the fall of the interrupt signal P2 that and a C phase surge voltage has been generated. Numeral 552d is second temporary storage means for storing, via the input terminal P3c, a fact that a current of the magnetic field coil 103d has been interrupted with the rise of the interrupt signal P2 and that a D phase surge voltage has been generated. The first temporary storage means 552a and 552b are constituted of an identical memory, which is any one of the mentioned RAM memories 130. The second temporary storage means 552c and 552d are constituted of an identical memory, which is any other one of the mentioned RAM memories 130.

Numeral 553a is a step that operates when step 551a determines YES, and determines whether or not the synthetic state detection signal P3a is set in the first temporary storage means 552b. Numeral 553b is a step that operates when step 551*b* determines YES, and determines whether or not the synthetic state detection signal P3*a* is set in the first temporary storage means 552*a*. Numeral 553*c* is a step that operates when step 551*c* determines YES, and determines whether or not the synthetic state detection signal P3*c* is set in the second temporary storage means 552*d*. Numeral 553*d* is a step that operates when step 551*d* determines YES, and determines whether or not the synthetic state detection signal P3*c* is set in the second temporary storage means 552*c*.

Numeral 554*a* is a step that operates when step 553*a* determines YES, and resets the synthetic state detection signal, which is stored in the first temporary storage means 552*b*. Numeral 554*b* is a step that operates when step 553*b* determines YES, and resets the synthetic state detection signal, which is stored in the first temporary storage means 552*a*. Numeral 554*c* is a step that operates when step 553*c* determines YES, and resets the synthetic state detection signal, which is stored in the second temporary means 552*d*. Numeral 554*d* is a step that operates when step 553*d* determines YES, and resets the synthetic state detection signal, which is stored in the second temporary storage means 552*c*.

Numerals 555*a* to 555*d* are abnormality detection number counting steps (individual determination storage means= abnormality counting storage means for each phase). Among these steps, numeral 555*a* is a step that operates when step 553*a* determines NO, and adds and counts the number of times of detecting an abnormality using an B phase abnormality number counter, not shown. Numeral 555*b* is a step that operates when 553*b* determines NO, and adds and counts the number of times of detecting abnormality using a A phase abnormality number counter, not shown. Numeral 555*c* is a step that operates when step 553*c* determines NO, and adds and counts the number of times of detecting abnormality using a D phase abnormality number counter, not shown. Numeral 555*d* is a step that operates when step 553*d* determines NO, and adds and counts the number of times of detecting abnormality using a C phase abnormality number counter, not shown. A fact that any synthetic state detecting signal P3*c* or P3*a* is not generated by the mentioned steps 555*a* to 555*d* is extracted for each phase and stored.

Numeral 556 is a step that operates following the steps 554*a* to 554*d* or the steps 555*a* to 555*d*, and determines whether or not any of the number of times of detecting abnormality counted respectively in steps 555*a* to 555*d*, exceeds a predetermined value, or whether or not a total sum of the number of times of detecting abnormality counted in the mentioned steps 555*a* to 555*d*, exceeds a predetermined value. Numeral 557 is a step that operates when step 556 determines YES, and generates the drive output DR2 for the abnormality alarm display 107. Numeral 558 is a return label that operates when step 556 determines NO, or following the step 557, and proceeds to step 475*a* in FIG. 10.

The mentioned operations are summarized as follow. The operation in the steps 551*a* to 555*a* is a process that detects any abnormality in the A phase magnetic field coil 103*b* system, and adds and counts the number of times of detecting abnormality. The operation in the steps 551*b* to 555*b* is a process that detects any abnormality in the B phase magnetic field coil 103*a* system, and adds and counts the number of times of detecting abnormality. The operation in the steps 551*c* to 555*c* is a process that detects any abnormality in the D phase magnetic field coil 103*d* system, and adds and counts the number of times of detecting abnormality. The operation in the steps 551*d* to 555*d* is a process that detects any abnormality in the C phase magnetic field coil 103*c* system, and adds and counts the number of times of detecting abnormality. In each system, disconnection and short circuit abnormalities in the magnetic filed coil, the open/close elements, and the wiring are synthesized, and detected in an inseparable manner. Furthermore, the number of times provided by the abnormality count counter for each phase is added and counted not only in the mentioned step 555*a* to 555*d*, but also they are counted in steps 655*a* to 655*d* of FIG. 12. Accordingly a total current value, which is subject to comparison in step 556, is obtained by adding up both values.

Figure 12:
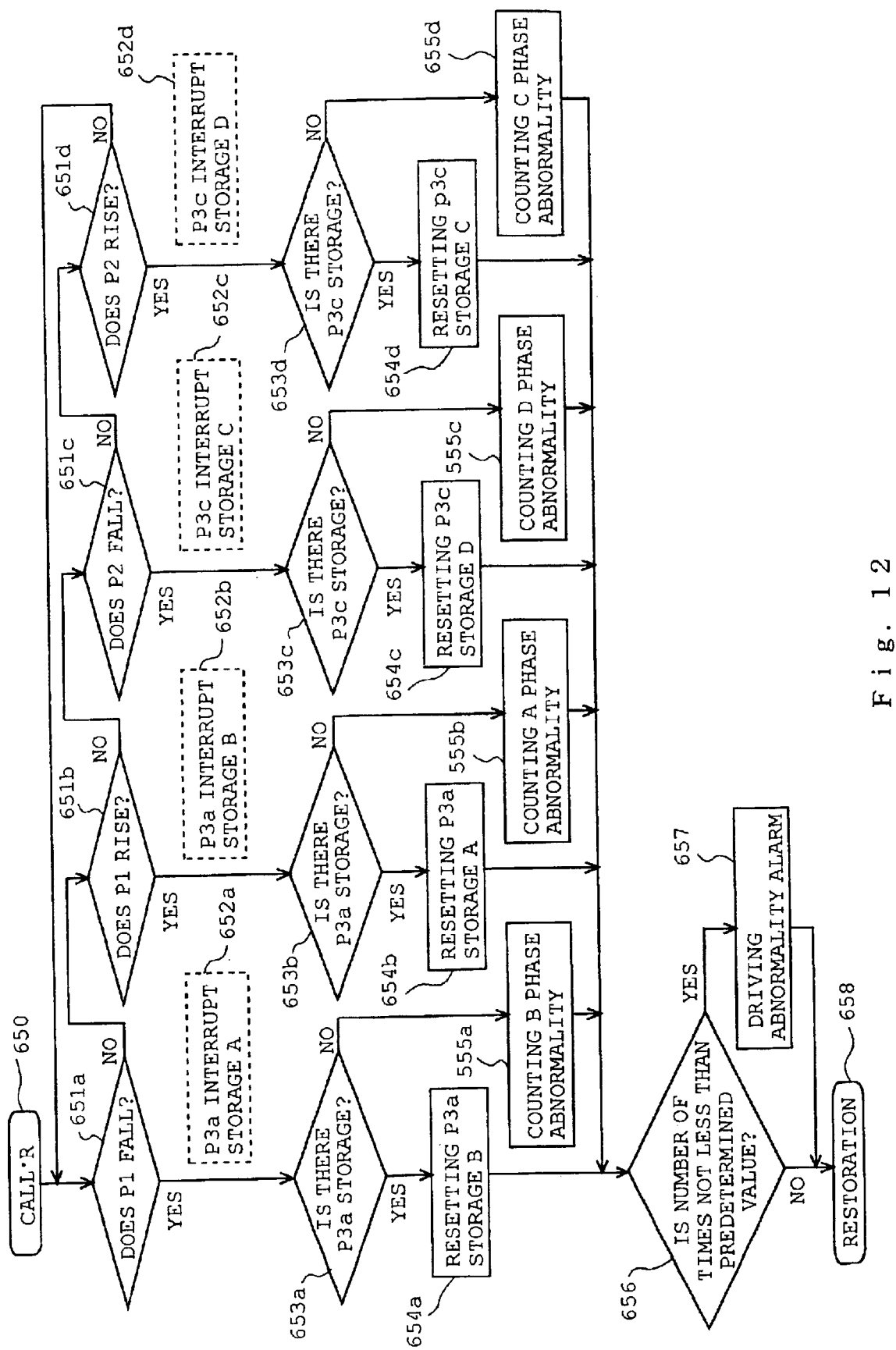
FIG. 12 is a flow chart explaining an abnormality detecting operation during the reverse rotation of the stepping motor of FIG. 7.

With reference to FIG. 12 showing a flowchart for explaining an abnormality detection operation in the reverse rotation according to the first embodiment of FIG. 7, numeral 650 is an operation start step of the subroutine program, which is activated following step 471*b* or step 456. Numeral 658 is a return label that operates when step 656 determines NO, or following step 657, and proceeds to step 475*b* or step 461 of FIG. 10. The operations in the mentioned steps 650 to 658 are the same as in the case of FIG. 11, and of which numerals of 500*s* are replaced with the numerals of 600*s*. In addition, although as for numerals 552*a*, 552*b*, 652*a*, 652*b* shown in FIGS. 11 and 12, different numerals are affixed for reason of convenience, they are practically designated to identical first temporary storage means. This temporary storage means is provided in the RAM memory 130, and updates and stores the interrupt input signal being the synthetic state detection signal P3*a* for each group.

Likewise, as for numerals 552*c*, 552*d*, 652*c*, 652*d*, different numerals are designated for reason of convenience. They are, however, practically identical second temporary storage means. The foregoing temporary storage means is provided in the RAM memory 130, and updates and stores the interrupt input signal being the synthetic state detection signal P3*c* for each group.

Considering the above description, action and operation referring to FIG. 7 is summarized as follows. A rotational amount of the stepping motor 101*b* sequentially driven by the pulse train generated by the open/close elements 114*a* to 114*d* is measured by means of the current value counter 132 for reversibly counting the generated pulse train. Then a reversible drive is carried out in accordance with a relative deviation from a target position. The stepping motor 101*b* is regarded as being returned to its origin with a fact that the moving body 102*b* is provided with a return drive pulse train enough to come in contact with the position of the stopper 102*c* and stop there.

When the open/close elements 114*a* to 114*d* carry out an interruption after feeding power to the magnetic field coils 103*a* to 103*d*, a surge voltage is generated at the terminals A1 to D1. In the event, however, that the open/close elements cannot interrupt a current due to a short circuit fault, or the open/close elements cannot apply any current due to any abnormality in open-circuit, any interrupting surge voltage is not generated. Also in the case event that the magnetic field coils are in any disconnection and short circuit, or any disconnection or earth fault in wiring path (fault contact of the wiring between the terminals A1 to D1 and the terminals A2 to D2 with a negative side terminal of the on-vehicle battery 104) or accidental rise up in power source voltage (fault contact of the wiring between the terminals A1 to D1 and the terminals A2 to D2 with a positive side terminal of the on-vehicle batter 104) takes place, the interrupt surge voltage is not generated, either.

To reduce the number of control inputs to the microprocessor 110*b*, the surge voltages in A phase and B phase are connected in parallel using the diode 116a for OR connection. When, however, any abnormality occurs, it is necessary to identify which phase is abnormal. In the same manner, although the surge voltages in C phase and D phase are connected in parallel using the diode 116c OR connection, it is necessary to identify which phase is abnormal when any abnormality occurs. In addition, even when the stepping motor 101b rotates at a high speed, a logical addition output from the diode 116a or 116c is kept at an intermittent interrupt signal level so that separation for each phase can be done. As described above, the surge voltages, which are not adjacent to each other, are connected in parallel through the diode 116a or 116c thereby enabling abnormality detection during operation at a high speed. Thus, number of input terminals to the microprocessor 110b is reduced, and furthermore separation of the abnormality occurrence phase can be done.

Further Embodiment of the Invention

In the detector according to the foregoing first embodiment of this invention shown in FIG. 1, the temporary storage means is constituted of the flip-flop circuit 125, which is provided outside of the microprocessor 110a. However, it is also preferable that the synthetic state detection signal P3 is directly connected to the interrupt input terminal of the microprocessor 110a, and the flip-flop circuit 125 is omitted to use the RAM memory 130. In the detector according to the second embodiment of the invention shown in FIG. 7, the RAM memory 130, which is provided in the microprocessor 110b, is used as the temporary storage means. The magnetic field coils are divided into a group of the magnetic field coils 103a, 103b and a group of the magnetic field coils 103c, 103d, and a pair of temporary storage means is used. However, it is also preferable that the temporary storage means is provided individually for each magnetic field coil.

In the embodiments of FIGS. 1 and 7, an open loop control method is employed in which method a current value counter is provided in order to measure a drive amount of the stepping motor. The current value counter counts reversibly a drive pulse with respect to the stepping motor. However, supposing that the rotor of the stepping motor is provided with a two-phase type of rotation sensor and a pulse generated by the rotation sensor is counted reversibly by a current value counter, closed loop control can be done for positional control. Furthermore, supposing that an absolute positional detection sensor is provided instead of the mentioned rotation sensor, the return-to-origin-detecting switch can be also omitted.

Now, features and advantages of the abnormality detector for motor drive system according to this invention are summarized with the inclusion of additional ones.

As a first feature, an abnormality detector according to the invention includes: a plurality of open/close elements that, in response to an interrupt signal generated by a microprocessor, energizes multiphase magnetic field coils in a predetermined order and drives a forward/reverse rotation of a stepping motor; individual state detection means for each phase; synthetic state detection means for all phases; temporary storage means; individual determination storage means; reset means; and abnormality alarm display means. The mentioned individual state detection means detects individually a surge voltage for each phase, the surge voltage being generated when interrupting the power conduction through the mentioned magnetic field coils by the mentioned open/close elements, and confirms power conduction through the mentioned magnetic field coils or interruption thereof. The mentioned synthetic state detection means logically adds signals detected by the mentioned individual state detection means, and generates a synthesized signal in order to confirm power conduction through the mentioned magnetic field coils or interruption thereof for all phases. The mentioned temporary storage means stores generation of a synthesized signal detected by the mentioned synthetic state detection means. The mentioned individual determination storage means reads out a content of the mentioned temporary storage stored with an interval of a fluctuation delay time immediately after an initial rise or fall of the mentioned interrupt signal following a pause for not less than a predetermined time of the mentioned interrupt signal at the moment of a next rise or fall of the mentioned interrupt signal, and stores presence or absence of an abnormality (whether or not there is any abnormality) for each phase. The mentioned reset means deletes the content in the mentioned temporary storage means after the mentioned individual determination storage means stores presence or absence of an abnormality for each phase at this time, and enables a synthesized signal generated at the next time to be stored. The mentioned abnormality alarm display means operates an abnormality alarm display in response to a fact that at least one of the mentioned individual determination storage means stores any abnormality. Further, the mentioned individual determination storage means stores, for each phase of which power-conduction has been interrupted, a fact that any synthesized detection signal of the mentioned surge voltage is not generated upon initially interrupting the power conduction after the mentioned stepping motor pauses for not less than a predetermined time, and carries out an abnormality determination at the time of starting a forward/reverse drive of the mentioned stepping motor.

As a result of the mentioned first feature, number of signals to be processed is reduced thereby making a hardware constitution inexpensive and simple. Furthermore, even if the detected surge voltage comes to form a seamless and continuous waveform at a high-speed operation of the stepping motor, abnormality for each phase can be detected without fail.

As a second feature, in the foregoing abnormality detector for motor drive system according to the invention, it is preferable to add return-to-origin operation control means for operating at an initial stage of operation when a power supply is turned on or/and at a final stage of operation immediately before turning off the power supply. This return-to-origin operation control means conducts a one-way return to original position at a low speed of not exceeding a limit within which the mentioned surge voltage waveform is an intermittent waveform. Further, the mentioned individual determination storage means stores, for each phase power-conducted or interrupted, a fact that the synthesized detection signal for the mentioned surge voltage is not generated with respect to initial interruption of the power conduction after drive start of the mentioned stepping motor or a reversal in rotational direction thereof. The mentioned return-to-origin operation control means also stores, for each phase power-conducted or interrupted, a fact that the synthesized detection signal for the mentioned surge voltage is not generated during return-to-origin operation of the mentioned stepping motor.

As a result of the mentioned second feature, the abnormality for each phase can be detected at the time of starting the operation and during the operation so that occurrence of any abnormality can be detected immediately.

As a third feature, the foregoing abnormality detector for motor drive system of the invention further includes: a power supply relay that operates immediately upon turning on the power supply switch to feed power to the abnormality detector, and carries out a delay interruption operation in which power supply interruption is conducted after continuing a power supply during a time from turning off the mentioned power supply switch at least until returning of the mentioned stepping motor to the origin; a current position counter that operates for counting reversibly a drive pulse amount or a movement pulse amount of the mentioned stepping motor, thereby measuring a current rotational position of the stepping motor; and a return-detecting switch that operates upon returning of the mentioned stepping motor to the original position to reset the mentioned current value counter, and conducts the return-to-origin after stopping the operation upon turning off of the mentioned power supply switch, thereby enabling a normal operation to be started immediately after turning on the power supply.

As a result of the mentioned third feature, the return-to-origin has been done after stopping the operation when the power supply relay has been interrupted. Consequently a normal operation can be immediately started upon confirming the operation of the return-detecting switch at the time of turning on the power supply.

As a fourth feature, the foregoing abnormality detector for motor drive system includes: a current value counter for counting reversibly a drive pulse amount or a movement pulse amount of the mentioned stepping motor to measure a current rotational position of the stepping motor; maximum amount setting means for setting a target drive pulse amount sufficient to carry out a movement from a forward rotational limit position to a reverse rotational limit position of the stepping motor, the pulse amount being set on the mentioned current value counter previous to the return-to-origin operation; a return-detecting switch that operates when the mentioned stepping motor returns to its original position, and operates so as to reset the mentioned current value counter; and return abnormality determination means for determining whether or not the mentioned return-detecting switch operates after conducting the return-to-origin operation with the mentioned target drive pulse amount, and for detecting an abnormality in the mentioned stepping motor or a mechanism system to operate the abnormality alarm display.

As a result of the mentioned fourth feature, any abnormality in the stepping motor or the machine system can be detected, and then the mentioned abnormality alarm display can be operated.

As a fifth feature, in the foregoing abnormality detector for motor drive system, it is preferable to employ a flip-flop circuit as the mentioned temporary storage means, the mentioned flip-flop circuit being provided outside the mentioned microprocessor, being set in response to the mentioned synthetic state detection signal, and being read out and reset by the mentioned microprocessor.

As a result of the mentioned fifth feature, in the abnormality detector for motor drive system, burden for a high-speed processing control of the microprocessor is reduced to be suitable for high-speed operation control. Furthermore, one flip-flop circuit is quite enough as hardware since the detection signals are connected logically, making it possible to obtain an economical constitution.

As a sixth feature, in the foregoing abnormality detector for motor drive system, it is preferable to employ a RAM memory in the mentioned microprocessor as the mentioned temporary storage means, and the mentioned RAM memory is set via an interrupt input terminal of the microprocessor by which an input monitoring is periodically carried out at intervals of a shorter time than a pulse width of the mentioned synthetic state detection signal, the mentioned RAM memory being read out and reset within the microprocessor.

As a result of the mentioned sixth feature, the flip-flop circuit acting as the hardware to be connected outside the microprocessor is no more necessary, making impossible to obtain a smaller and more inexpensive constitution as a whole.

As a seventh feature, an abnormality detector for motor drive system according to this invention includes: a plurality of open/close elements that, in response to an interrupt signal generated by a microprocessor, energizes multiphase magnetic field coils in a predetermined order and drives a forward/reverse rotation of a stepping motor; individual state detection means for each phase; first and second synthetic state detection means for detecting first and second synthetic states; temporary storage means; individual determination storage means; reset means; and abnormality alarm display means. The mentioned individual state detection means detects individually a surge voltage for each phase, the surge voltage being generated when interrupting the power conduction through the mentioned magnetic field coils by the mentioned open/close elements, and generates a detection signal in order to confirm power conduction through the mentioned magnetic field coils or interruption thereof. The mentioned first and second synthetic state detection means logically adds signals in a group, which does not operate adjacently, among the signals detected by the mentioned individual state detection means, and generates a synthesized signal in order to confirm conduction or interruption for each group of magnetic field coils. The mentioned temporary storage means separates the synthesized signals, which have been detected by the mentioned first and second synthetic state detection means, at least for each group, via a first and second interrupt input terminals, and stores the separated signal in the RAM memory in the mentioned microprocessor. The mentioned individual determination storage means reads out a content of the mentioned temporary storage stored for each group with an interval of a fluctuation delay time immediately after a previous rise or fall of the mentioned interrupt signal output for each group at the moment of a rise or fall of the mentioned interrupt signal this time, and stores presence or absence of an abnormality (whether or not there is any abnormality) for each phase. The mentioned reset means deletes the content in the mentioned temporary storage means after the mentioned individual determination storage means stores presence or absence of an abnormality for each phase at this time, and enables a synthesized signal generated at the next time to be stored. The mentioned abnormality alarm display means operates an abnormality alarm display in response to a fact that at least one of the mentioned individual determination storage means stores any abnormality, and enables the abnormality determination in a state of the mentioned stepping motor being continuously driven at a high speed.

As a result of the mentioned seventh feature, a surge voltage acting as a detecting signal for each group shows an intermittent waveform even when the stepping motor operates at a high speed, thereby enabling the abnormality detection for each phase. Furthermore, number of signals to be processed is reduced thereby enabling simple and inexpensive abnormality detection.

As an eighth feature, the foregoing abnormality detector for motor drive system further includes: count determination means for counting number of times of occurring abnormality, which is stored in the mentioned individual determination storage means, and operating the mentioned abnormality alarm display means when the number of times of the abnormality occurring for each phase or a total sum of the number of times of the abnormality occurring for each phase exceeds a predetermined value.

As a result of the mentioned eighth feature, even if any malfunction occurs due to noise or the like, any impatient abnormality determination is not carried out, thus preventing an unnecessary confusion.

As a ninth feature, in the foregoing abnormality detector for motor drive system, it is preferable to add interface for connecting an external tool to the mentioned microprocessor. This external tool reads out and displays a content of the mentioned individual determination storage means, and the mentioned content is reset in response to a command from the mentioned external tool.

As a result of the mentioned ninth feature, any abnormal system can be identified. Consequently it becomes possible to check which is abnormal among the open/close elements, the magnetic field coils and the wiring, as to the identified abnormal phase, thereby enabling a prompt removal and replacement of an abnormal element.

While the presently preferred embodiments of the present invention have been shown and described, it is to be understood these disclosures are for the purpose of illustration and that various changes and modifications maybe made without departing from the scope of the invention as set forth in the appended claims.

What is claimed is:

1. An abnormality detector comprising:

a microprocessor;

a plurality of open/close elements that, in response to an interrupt signal generated by said microprocessor, energizes multiphase magnetic field coils in a predetermined order and drives a stepping motor in forward/reverse rotation;

individual state detection means that detects individually a surge voltage, for each phase, generated at the time of interrupting a power conduction through said magnetic field coils by said open/close elements, and generates a detection signal in order to confirm power conduction through said magnetic field coils or interruption thereof for each phase;

synthetic state detection means that logically adds signals detected by said individual state detection means, and generates a synthesized signal in order to confirm power conduction through said magnetic field coils or interruption thereof for all phases;

temporary storage means that stores generation of the synthesized signal detected by said synthetic state detection means;

individual determination storage means that reads out a content of said temporary storage stored with an interval of a fluctuation delay time immediately after an initial rise or fall of said interrupt signal following a pause for at least a predetermined time of said interrupt signal, at the moment of a next rise or fall of said interrupt signal, and stores presence or absence of an abnormality for each phase;

reset means that deletes the content in said temporary storage means after said individual determination storage means stores presence or absence of an abnormality for each phase at this time, and enables a synthesized signal generated at the next time to be stored; and abnormality alarm display means that operates an abnormality alarm display in response to at least one of said individual determination storage means storing any abnormality;

wherein said individual determination storage means stores, for each phase of which power-conduction has been interrupted, data indicating that any synthesized detection signal of said surge voltage is not generated upon initially interrupting the power conduction after said stepping motor pauses for at least a predetermined time, and carries out an abnormality determination at the time of starting a forward/reverse drive of said stepping motor.

2. The abnormality detector according to claim 1, further comprising: return-to-origin operation control means that operates at an initial stage of operation when a power supply is turned on and/or at a final stage of operation immediately before turning off the power supply, and conducts a one-way return to an original position at a low speed of not exceeding a limit within which said surge voltage waveform is an intermittent waveform;

wherein said individual determination storage means stores, for each phase power-conducted or interrupted, data indicating that the synthesized detection signal for said surge voltage is not generated with respect to initial interruption of the power conduction after drive start of said stepping motor or a reversal in rotational direction thereof; and further stores, for each phase power-conducted or interrupted, data indicating that the synthesized detection signal for said surge voltage is not generated during a return-to-origin operation of said stepping motor.

3. The abnormality detector for motor according to claim 2, further comprising:

a power supply relay that operates immediately upon turning on the power supply switch to feed power to the abnormality detector, and carries out a delay interruption operation in which power supply interruption is conducted after continuing a power supply during a time from turning off said power supply switch at least until returning of said stepping motor to the origin;

a current value counter that operates for counting reversibly a drive pulse amount or a movement pulse amount of said stepping motor, thereby measuring a current rotational position of the stepping motor; and a return-detecting switch that operates upon returning of said stepping motor to the original position to reset said current value counter, and conducts the return-to-origin after stopping the operation upon turning off of said power supply switch, thereby enabling a normal operation to be started immediately after turning on the power supply.

4. The abnormality detector according to claim 2, further comprising:

a current value counter for counting reversibly a drive pulse amount or a movement pulse amount of said stepping motor to measure a current rotational position of the stepping motor;

maximum amount setting means for setting a target drive pulse amount sufficient to carry out a movement from a forward rotational limit position to a reverse rotational limit position of the stepping motor, the pulse amount being set on said current value counter prior to the return-to-origin operation;

a return-detecting switch that operates when said stepping motor returns to its original position, and operates so as to reset said current value counter; and return abnormality determination means for determining whether or not said return-detecting switch operates after conducting the return-to-origin operation with said target drive pulse amount, and for detecting an abnormality in at least said stepping motor to operate the abnormality alarm display.

5. The abnormality detector according to claim 3, further comprising:
- a current value counter for counting reversibly a drive pulse amount or a movement pulse amount of said stepping motor to measure a current rotational position of the stepping motor;
- maximum amount setting means for setting a target drive pulse amount sufficient to carry out a movement from a forward rotational limit position to a reverse rotational limit position of the stepping motor, the pulse amount being set on said current value counter prior to the return-to-origin operation;
- a return-detecting switch that operates when said stepping motor returns to its original position, and operates so as to reset said current value counter; and
- return abnormality determination means for determining whether or not said return-detecting switch operates after conducting the return-to-origin operation with said target drive pulse amount, and for detecting an abnormality in at least said stepping motor to operate the abnormality alarm display.

6. The abnormality detector according to claim 1, wherein said temporary storage means comprises a flip-flop circuit, said flip-flop circuit being provided outside said microprocessor, being set in response to said synthetic state detection signal, and being read out and reset by said microprocessor.

7. The abnormality detector according to claim 2, wherein said temporary storage means comprises a flip-flop circuit, said flip-flop circuit being provided outside said microprocessor, being set in response to said synthetic state detection signal, and being read out and reset by said microprocessor.

8. The abnormality detector according to claim 1, wherein a RAM memory in said microprocessor is employed as said temporary storage means, said RAM memory is set via an interrupt input terminal of the microprocessor by which an input monitoring is periodically carried out at intervals of a shorter time than a pulse width of said synthetic state detection signal, and said RAM memory is read out and reset within the microprocessor.

9. The abnormality detector according to claim 2, wherein a RAM memory in said microprocessor is employed as said temporary storage means, and said RAM memory is set via an interrupt input terminal of the microprocessor by which an input monitoring is periodically carried out at intervals of a shorter time than a pulse width of said synthetic state detection signal, and said RAM memory is read out and reset within the microprocessor.

10. The abnormality detector according to claim 1, further comprising:
- count determination means for counting a number of times of occurrence of an abnormality, which is stored in said individual determination storage means, and operating said abnormality alarm display means when either the number of times of the abnormality occurring for each phase or a total sum of the number of times of the abnormality occurring for each phase exceeds a predetermined value.

11. The abnormality detector according to claim 2, wherein said microprocessor is provided with an interface for connecting an external tool, and said external tool reads out and displays a content of said individual determination storage means, and said content is reset in response to a command from said external tool.

12. An abnormality detector comprising:
- a microprocessor;
- a plurality of open/close elements that, in response to an interrupt signal generated by said microprocessor, energizes multiphase magnetic field coils in a predetermined order and drives a stepping motor in forward/reverse rotation;
- individual state detection means that detects individually a surge voltage, for each phase, generated at the time of interrupting a power conduction through said magnetic field coils by said open/close elements, and generates a detection signal in order to confirm power conduction through said magnetic field coils or interruption thereof for each phase;
- first and second synthetic state detection means for detecting first and second synthetic states that logically adds signals in a group, which does not operate adjacently, among the signals detected by said individual state detection means, and generates a synthesized signal in order to confirm power conduction through magnetic field coils or interruption thereof for each group;
- temporary storage means that separates the synthesized signals detected by said first and second synthetic state detection means, at least for each group, via first and second interrupt input terminals, and stores the separated signal in the RAM memory in said microprocessor;
- individual determination storage means that reads out a content of said temporary storage stored for each group with an interval of a fluctuation delay time immediately after a previous rise or fall of said interrupt signal output for each group at the moment of a rise or fall of said interrupt signal at this time, and stores presence or absence of an abnormality for each phase;
- reset means that deletes the content in said temporary storage means after said individual determination storage means stores presence or absence of an abnormality for each phase at this time, and enables a synthesized signal generated at the next time to be stored; and
- abnormality alarm display means that operates an abnormality alarm display in response to at least one of said individual determination storage means storing any abnormality, and enables the abnormality determination in a state of said stepping motor being continuously driven at a high speed.

13. The abnormality detector according to claim 12, further comprising:
- count determination means for counting a number of times of occurrence of an abnormality, which is stored in said individual determination storage means, and operating said abnormality alarm display means when either the number of times of the abnormality occurring for each phase or a total sum of the number of times of the abnormality occurring for each phase exceeds a predetermined value.

14. The abnormality detector according to claim 12, wherein said microprocessor is provided with an interface for connecting an external tool, and said external tool reads out and displays a content of said individual determination storage means, and said content is reset in response to a command from said external tool.

* * * * *